(12) United States Patent
Aitken et al.

(10) Patent No.: US 11,261,063 B2
(45) Date of Patent: Mar. 1, 2022

(54) NACELLE-MOUNTED LIFT SYSTEM FOR WIND TURBINE

(71) Applicant: LiftWerx Holdings Inc., Cambridge (CA)

(72) Inventors: Glen D. Aitken, Fergus (CA); Ruud Bakker, Zaandam (NL)

( * ) Notice: Subject to any disclaimer, the term of this patent is extended or adjusted under 35 U.S.C. 154(b) by 0 days.

(21) Appl. No.: 17/210,875

(22) Filed: Mar. 24, 2021

(65) Prior Publication Data

US 2021/0206606 A1 Jul. 8, 2021

Related U.S. Application Data

(63) Continuation of application No. 16/552,072, filed on Aug. 27, 2019, now Pat. No. 10,988,351.

(Continued)

(51) Int. Cl.
*B66C 23/20* (2006.01)
*F03D 13/40* (2016.01)
(Continued)

(52) U.S. Cl.
CPC ............ *B66C 23/207* (2013.01); *B66C 23/68* (2013.01); *F03D 13/40* (2016.05); *F03D 80/88* (2016.05); *F03D 80/50* (2016.05); *F05B 2260/02* (2013.01)

(58) Field of Classification Search
CPC ....... B66C 1/108; B66C 23/207; B66C 23/68; B66C 23/185; F03D 13/40; F03D 80/50; F05B 2260/02

See application file for complete search history.

(56) References Cited

U.S. PATENT DOCUMENTS 2,668,625 A * 2/1954 Garland ................. B66C 23/36
  212/231
4,260,064 A * 4/1981 Ekstam ................. B66C 23/702
  212/231

(Continued)

FOREIGN PATENT DOCUMENTS

CA 2997876 A1 9/2018
CA 3012945 A1 10/2018

(Continued)

OTHER PUBLICATIONS

HoistingEquipment Star LMX050 product information. Dec. 12, 2017.

(Continued)

*Primary Examiner* — Jason L Vaughan
(74) *Attorney, Agent, or Firm* — Brunet & Co. Ltd.; Robert Brunet; Hans Koenig

(57) ABSTRACT

A nacelle-mountable lift system for mounting and dismounting a rotor blade of a wind turbine involves a jib crane, the jib crane having a base removably mountable on a nacelle of the wind turbine and a jib mounted on the base. The jib has a boom arm supported on the base by at least one support strut extending between the base and the boom arm. A winch is mounted on the boom arm. At least two sheaves are rotatably mounted on the boom arm. A holder is connectable to the blade. At least two lift cables pass over the at least two sheaves connecting the holder to the winch. The boom arm is positionable to position the holder beyond a rotor hub of the wind turbine when the crane is mounted on the nacelle.

7 Claims, 27 Drawing Sheets

Related U.S. Application Data

(60) Provisional application No. 62/725,840, filed on Aug. 31, 2018.

(51) Int. Cl.
  *B66C 23/68* (2006.01)
  *F03D 80/80* (2016.01)
  *F03D 80/50* (2016.01)

(56) References Cited

U.S. PATENT DOCUMENTS

| | | | |
|---|---|---|---|
| 5,060,427 A * | 10/1991 | Bernabe, Jr. | B66C 23/701 |
| | | | 52/118 |
| 6,044,991 A * | 4/2000 | Freudenthal | B66C 23/90 |
| | | | 212/278 |
| 7,341,157 B2 * | 3/2008 | Slobogean | B66C 23/00 |
| | | | 212/250 |
| 8,104,631 B2 * | 1/2012 | Stegemann | F03D 80/50 |
| | | | 212/179 |
| 8,998,546 B2 | 4/2015 | Fenger | |
| 9,494,133 B2 | 11/2016 | Lohan et al. | |
| 9,500,090 B2 | 11/2016 | Nielsen | |
| 9,522,626 B2 | 12/2016 | Hansen et al. | |
| 9,630,816 B1 * | 4/2017 | Napieralski | B66D 3/00 |
| 9,638,163 B2 | 5/2017 | Holloway et al. | |
| 9,651,020 B2 | 5/2017 | Holloway et al. | |
| 9,897,068 B2 | 2/2018 | Bendel | |
| 10,066,601 B2 | 9/2018 | Neumann | |
| 10,081,519 B2 | 9/2018 | Muller | |
| 10,287,138 B2 * | 5/2019 | Italiano | B66C 23/06 |
| 2007/0273154 A1 * | 11/2007 | Pedersen | B66C 23/027 |
| | | | 290/44 |
| 2010/0101086 A1 * | 4/2010 | Amram | B66C 23/207 |
| | | | 29/889.1 |
| 2010/0139062 A1 | 6/2010 | Reed et al. | |
| 2014/0252285 A1 * | 9/2014 | Genoe | B66C 23/44 |
| | | | 254/280 |
| 2016/0115001 A1 * | 4/2016 | Italiano | B66C 23/166 |
| | | | 212/299 |
| 2017/0045029 A1 | 2/2017 | Senthoorpandian et al. | |
| 2017/0067447 A1 | 3/2017 | Reynolds et al. | |
| 2017/0218915 A1 | 8/2017 | Wilmot et al. | |
| 2017/0306930 A1 * | 10/2017 | Fenger | F03D 80/50 |
| 2018/0195497 A1 | 7/2018 | Neumann | |
| 2019/0017495 A1 | 1/2019 | Johnson et al. | |
| 2019/0024639 A1 | 1/2019 | Davidson et al. | |
| 2019/0032638 A1 | 1/2019 | Garitaonandia et al. | |
| 2019/0032639 A1 | 1/2019 | Thomsen et al. | |

FOREIGN PATENT DOCUMENTS

| | | |
|---|---|---|
| CN | 103723614 A | 4/2014 |
| CN | 105649893 A | 6/2016 |
| DK | 201400575 A1 | 4/2016 |
| EP | 2873641 B1 | 2/2017 |
| WO | 2012/095112 A1 | 7/2012 |
| WO | 2013/167138 A1 | 11/2013 |
| WO | 2014/082641 A1 | 6/2014 |
| WO | 2018/046436 A1 | 3/2018 |
| WO | 2018/054440 A1 | 3/2018 |

OTHER PUBLICATIONS

Areva Blades product information. Dec. 12, 2017.
Barnhart Blade Removal and Replacement product information. Dec. 12, 2017.
Caldwell Lifting Solutions Three Point Beam product information. Dec. 12, 2017.
Hawk Lifting Engineering 4 Point Lifting Frame—SWL product information. Dec. 12, 2017.
Liftra Blade Dragon product information. Dec. 12, 2017.
Liftra LT485 Lifting Yoke. Dec. 12, 2017.
Liftra LT1100 Blade Way product information. Jan. 1, 2018.

* cited by examiner

NACELLE-MOUNTED LIFT SYSTEM FOR WIND TURBINE

CROSS-REFERENCE TO RELATED APPLICATIONS

This application is a continuation of United States patent application U.S. Ser. No. 16/552,072 filed Aug. 27, 2019, which claims the benefit of United States Provisional Application U.S. Ser. No. 62/725,840 filed Aug. 31, 2018, the entire contents of both of which are herein incorporated by reference.

FIELD

This application relates to wind turbines, in particular to a nacelle-mounted lift system, especially for mounting and dismounting a rotor blade of a wind turbine.

BACKGROUND

Wind turbines require periodic maintenance to remain operable. Due to the extreme height at which many wind turbines operate, maintaining and/or replacing turbine parts becomes problematic. For reasons of safety and practicality, turbine parts are generally lowered to ground level for maintenance and/or replacement. Typically, a crane is used to lower (and then re-raise) the parts to be maintained or replaced. However, existing nacelle-mounted cranes are insufficient for lifting and lowering very heavy parts of the wind turbine, such as rotor, blades and other very heavy parts of the wind turbine.

When erecting and de-erecting a rotor blade on a hub of a wind turbine, current state-of-the-art procedure involves using a sheave system mounted on the hub together with a ground-based tailing crane for raising and lowering the rotor blade. Such systems require the sheave system to be installed on-site, which is time-consuming and hazardous. Further, the sheave system must be uninstalled and re-installed if multiple rotor blades are to be erected and/or de-erected from the hub.

There have been nacelle-mounted cranes developed in the prior art specifically adapted for maintenance of various nacelle components. However, prior art nacelle-mounted cranes generally suffer from a lack of sufficient lifting capacity and are improperly positioned to erect and de-erect rotor blades. Accordingly, rotor blades are erected and de-erected by the aforementioned state-of-the-art procedure.

There remains a need for a nacelle-mounted crane that is capable of lifting and lowering a rotor blade and other very heavy parts of a wind turbine, such as a generator.

SUMMARY

In one aspect, there is provided a nacelle-mountable lift system for mounting and dismounting a rotor blade of a wind turbine, the lift system comprising: a jib crane mountable on the nacelle, the jib crane comprising a boom arm positionable to position a holder beyond a front of a rotor hub of the wind turbine when the jib crane is mounted on the nacelle; and, a blade sheath configured to retain the rotor blade, the blade sheath connectable to the holder, the holder raiseable and lowerable by the jib cane to raise and lower the sheath with the rotor blade retained therein when the rotor blade is disconnected from the hub or to raise and lower the sheath to retain the rotor blade in or release the rotor blade from the sheath when the rotor blade is connected to the hub.

In one aspect, there is provide a nacelle-mountable lift system for mounting and dismounting a rotor blade of a wind turbine, the lift system comprising: a jib crane, the jib crane comprising a base removably mountable on a nacelle of the wind turbine and a jib mounted on the base, the jib comprising a boom arm supported on the base by at least one support strut extending between the base and the boom arm, a winch mounted on the boom arm, at least one sheave rotatably mounted on the boom arm, a holder and at least one lift cable passing over the at least one sheave connecting the holder to the winch, the boom arm positionable to position the holder beyond a front of a rotor hub of the wind turbine when the crane is mounted on the nacelle; and, a blade sheath comprising an elongated case having an open top end for receiving a tip of the rotor blade and a bottom end, the blade sheath configured to retain the rotor blade, the blade sheath connectable to the holder by lines attachable to the top end of the sheath, the holder raiseable and lowerable by the winch to raise and lower the sheath with the rotor blade retained therein when the rotor blade is disconnected from the hub or to raise and lower the sheath to retain the rotor blade in or release the rotor blade from the sheath when the rotor blade is connected to the hub.

In one aspect, there is provided a lift system mountable on a nacelle of a wind turbine, the lift system comprising: a base rotatably and removably mountable on the nacelle; a jib pivotally and removably mounted on the base; a first actuator mounted between the base and the jib, operation of the first actuator pivoting the jib to raise and lower the jib; a pre-reeved module, the pre-reeved module comprising a boom arm pivotally and removably mounted on the jib, a winch mounted on the boom arm, a pair of opposed spaced-apart sheaves rotatably mounted on the boom arm, a holder, and lines passing over the sheaves connecting the holder to the winch; a second actuator mounted between the jib and the boom arm, operation of the actuator pivoting the boom arm to raise the boom arm into linear alignment with the jib; and, a fastener for immovably fastening the boom arm to the jib when the boom arm is in linear alignment with the jib.

In one aspect, there is provided a nacelle-mountable lift system for mounting and dismounting a rotor blade of a wind turbine, the lift system comprising: a jib crane, the jib crane comprising a base removably mountable on the nacelle and a jib removably mounted on the base; a pre-reeved module, the pre-reeved module comprising a boom arm removably mounted on the jib, a winch mounted on the boom arm, a pair of opposed spaced-apart sheaves rotatably mounted on the boom arm, a holder, and cables passing over the sheaves connecting the holder to the winch, the boom arm positionable to position the holder beyond a front of a hub of a rotor of the wind turbine; and, a blade sheath comprising an elongated case having an open top end for receiving a tip of the rotor blade and a bottom end, the blade sheath configured to retain the rotor blade, the blade sheath connectable to the holder by lines attachable to the top end of the sheath, the holder raiseable and lowerable by the winch to raise and lower the sheath with the rotor blade retained therein when the rotor blade is disconnected from the hub or to raise and lower the sheath to retain the rotor blade in or release the rotor blade from the sheath when the rotor blade is connected to the hub.

In one aspect, there is provided a method of erecting or de-erecting a rotor blade from a hub of a rotor of a wind turbine, the method comprising: mounting a jib crane on a nacelle of the wind turbine by assembling a base of the crane on the nacelle and a jib of the crane on the base, the jib comprising a boom arm, a winch mounted on the boom arm, at least one sheave rotatably mounted on the boom arm, a holder and at least one lift cable passing over the at least one sheave to connect the holder to the winch; positioning a distal end of the jib so that the at least one sheave is positioned beyond a front of the hub with the holder positioned below the at least one sheave; providing a blade sheath at a base of the wind turbine and connecting the holder to the blade sheath; and, operating the winch to raise or lower the blade sheath.

In one aspect, there is provided a method of erecting or de-erecting a rotor blade from a hub of a rotor of a wind turbine, the method comprising: mounting a jib crane on a nacelle of the wind turbine by sequentially assembling a base on the nacelle, a jib on the base and a pre-reeved module on the jib, the pre-reeved module comprising a boom arm mountable on the jib, a winch mounted on the boom arm, a pair of opposed spaced-apart sheaves rotatably mounted on the boom arm, a holder, and cables passing over the sheaves connecting the holder to the winch, the boom arm positionable to position the holder beyond a front of the hub of the rotor of the wind turbine; providing a blade sheath at a base of the wind turbine and connecting the holder to the blade sheath; and, operating the winch to raise or lower the blade sheath.

In one embodiment, the base comprises a vertically oriented mast having a vertically lower proximal end and a vertically higher distal end, the proximal end of the base mountable on the nacelle.

In one embodiment, the base is rotatable about a vertical pivot axis to orient the jib laterally around the nacelle.

In one embodiment, the jib has a proximal end and a distal end, the proximal end of the jib is pivotally mounted on the base to be pivotable about a horizontal pivot axis to permit raising and lowering of the distal end of the jib.

In one embodiment, the distal end of the jib extends over and beyond the rotor hub when the crane is mounted on the nacelle.

In one embodiment, the at least one support strut comprises two side-mounted hydraulic cylinders pivotally connected to the base and to opposed sides of the boom arm. The hydraulic cylinders may be operable to pivot the jib about a horizontal pivot axis to raise and lower the distal end of the jib.

In one embodiment, the first actuator is pivotally mounted on the base and jib between the proximal end of the base and the distal end of the jib, the operation of the first actuator pivoting the jib to raise and lower the distal end of the jib.

In one embodiment, the boom arm has a proximal end and a distal end, the proximal end of the boom arm mounted on the distal end of the jib.

In one embodiment, the at least one sheave comprises a pair of opposed spaced-apart sheaves mounted on the boom arm at the distal end of the jib, for example at the distal end of the boom arm. The at least one sheave may be rotatably mounted.

In one embodiment, the at least one lift cable comprises two lift cables passing over the opposed spaced-apart sheaves connecting the holder to the winch.

In one embodiment, the at least one lift cable comprises at least one lift cable grommet, the holder comprises at least one holder cable permanently installed thereon comprising at least one holder cable grommet complementary to the at least one lift cable grommet, and the lift system further comprises a connecting pin insertable through the complementary grommets to secure the holder to the at least one lift cable.

In one embodiment, the jib comprises a boom mounting bracket comprising first and second sets of spaced-apart aligned apertures and the boom arm comprises a jib mounting bracket having third and fourth sets of spaced-apart aligned apertures alignable with the first and second sets of spaced-apart aligned apertures of the boom mounting bracket, respectively, wherein the boom arm is pivotally mounted on the jib by a removable pivot pin inserted through the first and third sets of aligned apertures.

In one embodiment, the fastener comprises a removable securing pin inserted through the second and fourth sets of aligned apertures when the pivot pin is inserted through the first and third sets of aligned apertures and the boom arm is in linear alignment with the jib.

In one embodiment, the second actuator comprises a hydraulic cylinder pivotally mounted on the jib and on the boom arm, and wherein actuation of the hydraulic cylinder when the pivot pin is inserted through the first and third sets of aligned apertures can raise the boom arm to align the second and fourth sets of aligned apertures to permit inserting the securing pin through the second and fourth sets of aligned apertures.

In one embodiment, the lift system further comprises an insert removably but immovably mounted on the jib between the jib and the boom arm, the boom arm removably mounted on the jib via the insert.

In one embodiment, the jib, insert and boom arm have a total length sufficient to position the holder beyond the front of the hub when the base is rotated to orient the jib toward and above the rotor.

In one embodiment, de-erecting the rotor blade from the hub of the rotor of the wind turbine further comprises: orienting a first rotor blade to point downward so that a tip of the first rotor blade is positioned at a closest point to the base of the wind turbine; operating the winch of the jib crane mounted on the nacelle of the wind turbine to raise the blade sheath up to the first rotor blade to sheathe the rotor blade in the blade sheath; disconnecting the rotor blade from the hub; and, using the jib crane mounted on the nacelle of the wind turbine to lower the blade sheath containing the rotor blade down to the base of the wind turbine.

In one embodiment, erecting the rotor blade on the hub of the rotor of the wind turbine further comprises: providing the rotor blade retained in the blade sheath at the base of the wind turbine; connecting the holder to the blade sheath with the rotor blade retained in the blade sheath; operating the winch of the jib crane mounted on the nacelle of the wind turbine to raise the blade sheath with the rotor blade retained therein until a root of the rotor blade meets the hub; and, connecting the root of the rotor blade to the hub.

The lift system of the present invention is more straightforward to install than prior art sheave systems. Further, when the lift system is used to erect and de-erect rotor blades, the lift system may be used to raise and lower another rotor blade to and from the same hub without the need to change the configuration or position of the lift system, thereby reducing the time and effort required to erect and de-erect multiple rotor blades on and from the same hub. Furthermore, in prior art systems, once the sheaves are installed, the nacelle cannot be turned into the wind if wind direction changes, which can lead to collapse of the tower due to oblique wind angles causing undesirable loading on the tower. The lift system of the present invention permits the nacelle to be yawed into the wind thereby avoiding oblique wind angles, even when the blade sheath is installed on one of the rotor blades.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1A:
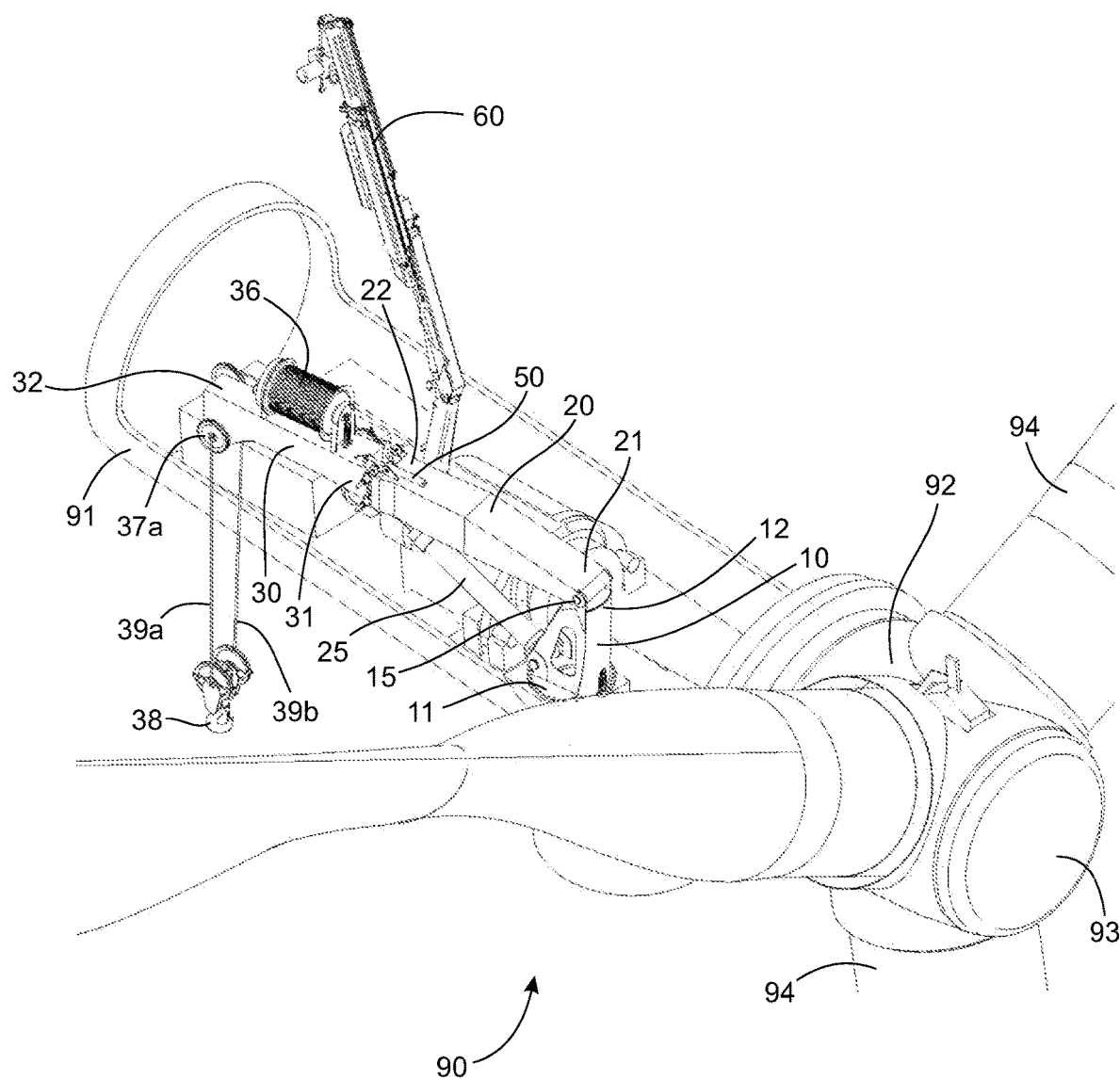
FIG. 1A depicts a lift system of the present invention mounted on a nacelle of a wind turbine.

With reference to the Figures, in FIG. 1A to FIG. 5B, a nacelle-mountable lift system 1 comprises a base 10, a jib 20, a jib actuator 25, a pre-reeved module (PRM) 30 and a PRM actuator 50.

The base 10 has a proximal end 11 rotatably and removably mountable on a nacelle 91 of a wind turbine 90. The base 10 is rotatable about a vertical axis, preferably through 360° to permit orienting the lift system in any horizontal direction. The base 10 is mountable on a mounting platform 89 situated proximate a front end of the nacelle 91 proximate to and behind a hub 93 of a rotor 92 of the wind turbine 90. A plurality of rotor blades 94, typically three rotor blades but there may be more or fewer rotor blades (e.g. 1, 2, 4, 5, etc.), are mounted on the hub 93. The rotor blades 94 are typically symmetrically arrayed around the hub 93 and extend laterally away from an axis of rotation of the hub 93.

The jib 20 is pivotally and removably mounted on the base 10, for example at or proximate a distal end 12 of the base 10. The jib 20 is pivotally mounted on the base 10, for example at or proximate a proximal end 21 of the jib 20, by a removable pivot pin 15. The jib actuator 25 is mounted between the proximal end 11 of the base 10 and a distal end 22 of the jib 20, whereby operation of the jib actuator 25 causes the jib 20 to pivot about the pivot pin 15 to tilt (i.e. raise and lower) the distal end 22 of the jib 20. The jib actuator 25 may be any suitable actuator, for example a hydraulic cylinder, a pneumatic cylinder, an electrical linear actuator, etc. A hydraulic cylinder is preferred.

The pre-reeved module (PRM) 30 is removably attached to the jib 20 at or proximate the distal end 22 of the jib 20. The pre-reeved module 30 comprises a boom arm 33. The boom arm 33 has a proximal end 31, which is pivotally and removably mounted on the distal end 22 of the jib 20. The boom arm 33 is pivotable about a removable PRM pivot pin 34 pivotally attaching the boom arm 33 to the jib 20, but the boom arm 33 can be secured against pivoting by a removable PRM securing pin 35 also attaching the boom arm 33 to the jib 20.

The PRM actuator 50 connects the jib 20 to the boom arm 33. The PRM actuator 50 is preferably mounted between the distal end 22 of the jib 20 and the proximal end 31 of the boom arm 33. The removable PRM pivot pin 34 is located below the PRM securing pin 35 so that when the boom arm 33 is first attached to the jib 20, a distal end 32 the boom arm 33 hangs down at an angle from the jib 20. However, the PRM actuator 50 is preferably mounted on or proximate top surfaces of the jib 20 and boom arm 33 so that actuation of the PRM actuator 50 can draw the distal end 32 of the boom arm 33 up. Thus, when the PRM actuator 50 connecting the boom arm 33 to the jib 20 is actuated, the boom arm 33, and therefore the pre-reeved module 30, can be brought into linear alignment with the jib 20 and immovably secured to the jib 20 with the PRM securing pin 35. With the two PRM pins 34,35 in place, the boom arm 33 is linearly aligned with and immovably secured on the jib 20. When the pre-reeved module (PRM) 30 is to be dismounted from the jib 20, the PRM securing pin 35 can be removed and the PRM actuator 50 can be actuated to lower the distal end 32 of the boom arm 33. The PRM actuator 50 may be any suitable actuator, for example a hydraulic cylinder, a pneumatic cylinder, an electrical linear actuator, etc. A hydraulic cylinder is preferred.

The pre-reeved module 30 also comprises a winch 36 mounted on the boom arm 33, a pair of opposed spaced-apart sheaves 37a and 37b rotatably mounted at or proximate the distal end 32 of the boom arm 33, a hook 38, and opposed spaced-apart lines 39a and 39b passing over the sheaves 37a and 37b, respectively, connecting the hook 38 to the winch 36. While a hook is illustrated, and suitable holder may be employed, for example a clasp, tie-downs, a clamp and the like. The winch 36 is preferably mounted on a top surface of the boom arm 33, although the winch 36 may be mounted at any convenient location on the boom arm 33. The lines 39a and 39b may also pass through opposed sheaves 41a and 41b, respectively, opposed sheaves 41a and 41b being rigidly connected to the hook 38. The lines 39a and 39b may be joined into line 39c to further facilitate operatively connecting the hook 38 to the winch 36.

The pre-reeved module 30 provides all of the lines, sheaves and winches needed at the top of the turbine 90 to be able to raise and lower heavy parts of the wind turbine 90. Because the pre-reeved module 30 is fully reeved prior to being installed at the top of the turbine 90, no complicated and dangerous reeving is required on-site, thereby saving time and enhancing safety.

Figure 2:
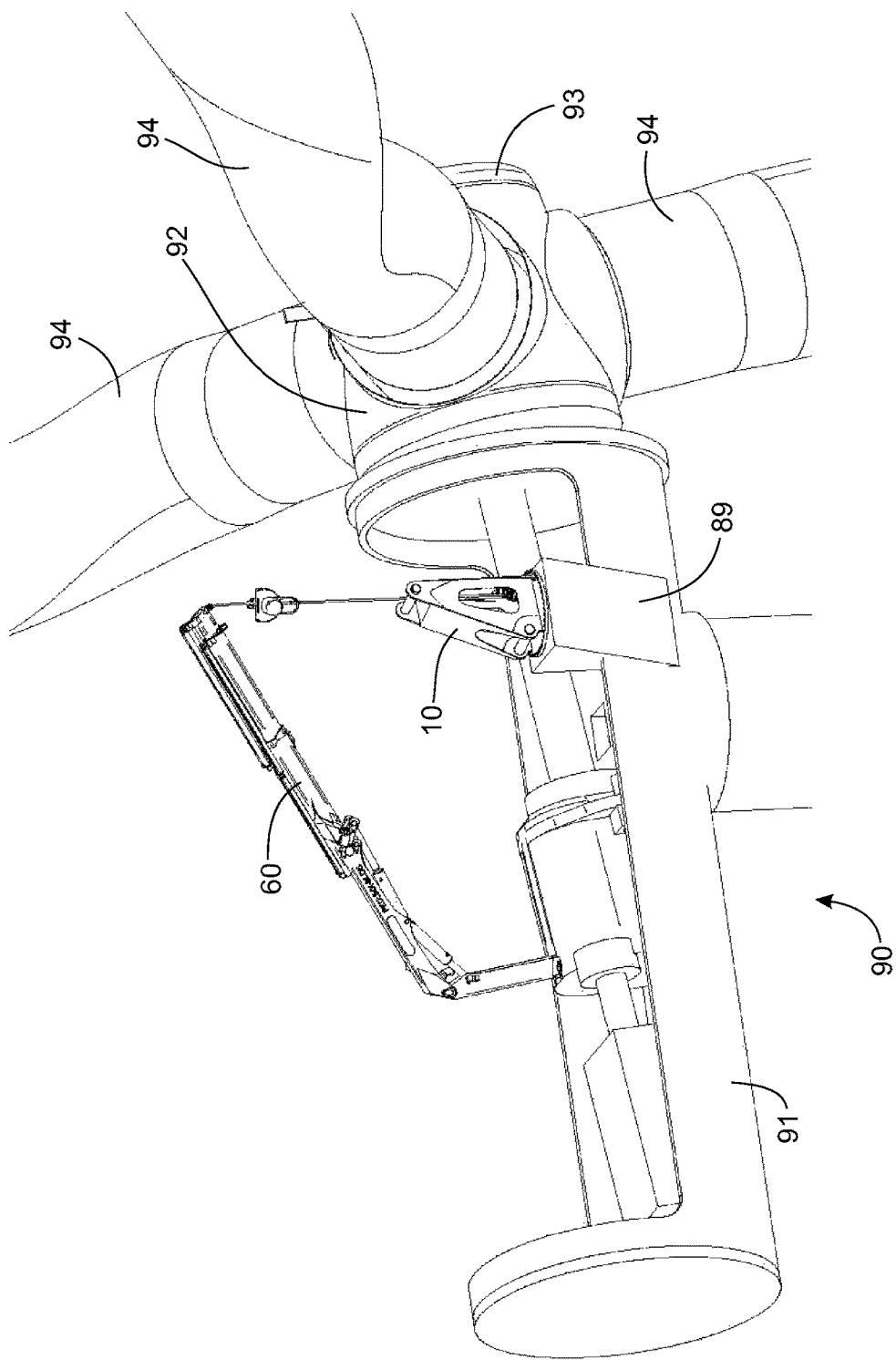
FIG. 2 depicts mounting a base of the lift system of FIG. 1A on the nacelle.

FIG. 2, FIG. 3, FIG. 4, FIG. 5A and FIG. 1A taken in order illustrate a method for installing the lift system 1 on the nacelle 91 of the wind turbine 90. As seen in FIG. 2, the base 10 is first raised up to the nacelle 91 by a smaller crane 60, for example a knuckle boom crane, and rotatably mounted on the mounting platform 89. The smaller crane 60 is not sufficient to raise and lower the very heavy parts of the wind turbine 90 for which the lift system 1 is intended. Hence, the lift system 1 must be heavy enough to handle the very heavy parts and is therefore composed of several parts, each of which is light enough for the smaller crane 60 to be able to lift up to the nacelle 91. An example of the smaller crane 60 is described in commonly owned United States Provisional Patent Application U.S. Ser. No. 62/589,778 filed Nov. 22, 2017, the entire contents of which is herein incorporated by reference.

Figure 1B:
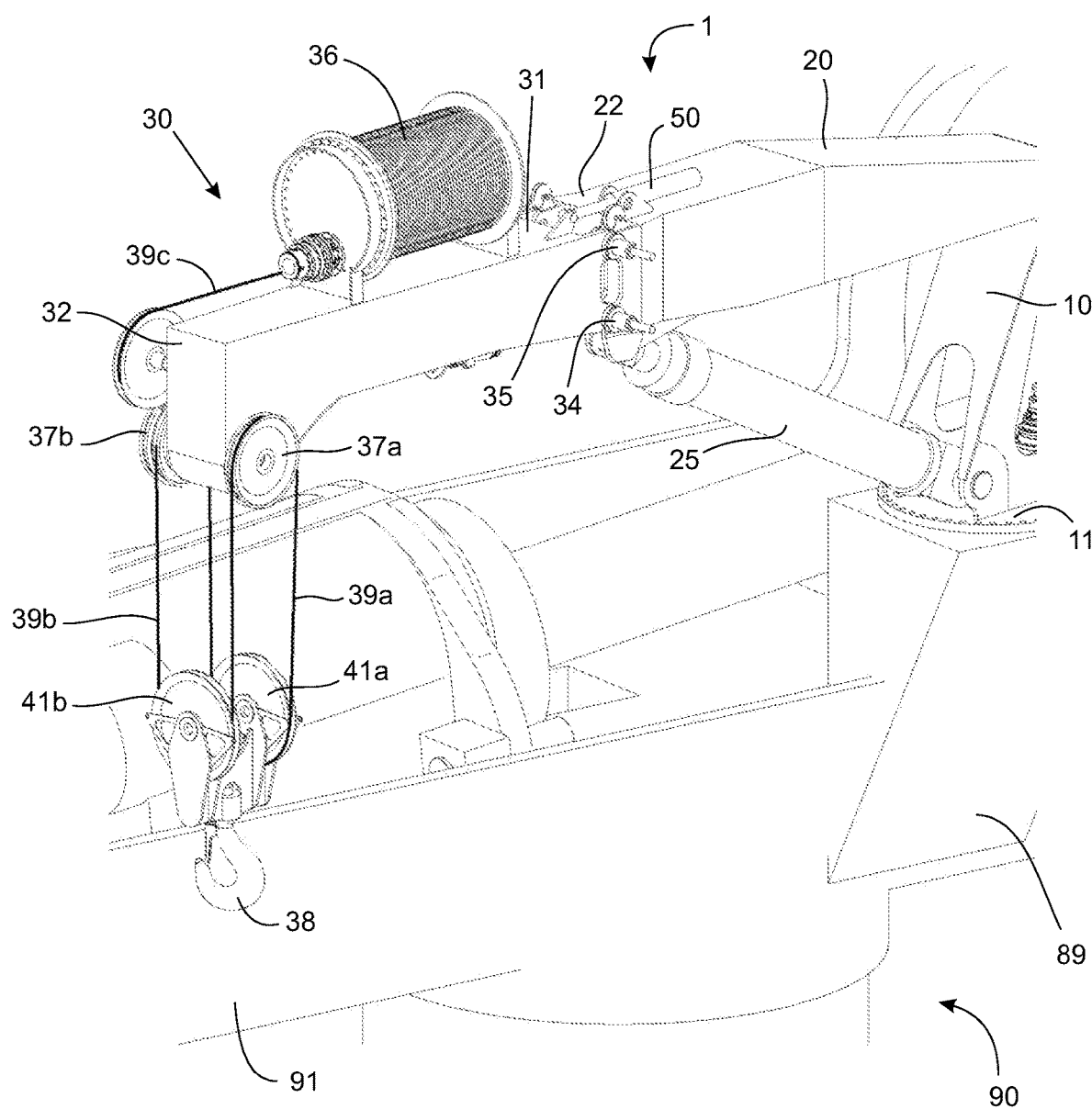
FIG. 1B is a magnified view of FIG. 1A.
Figure 3:
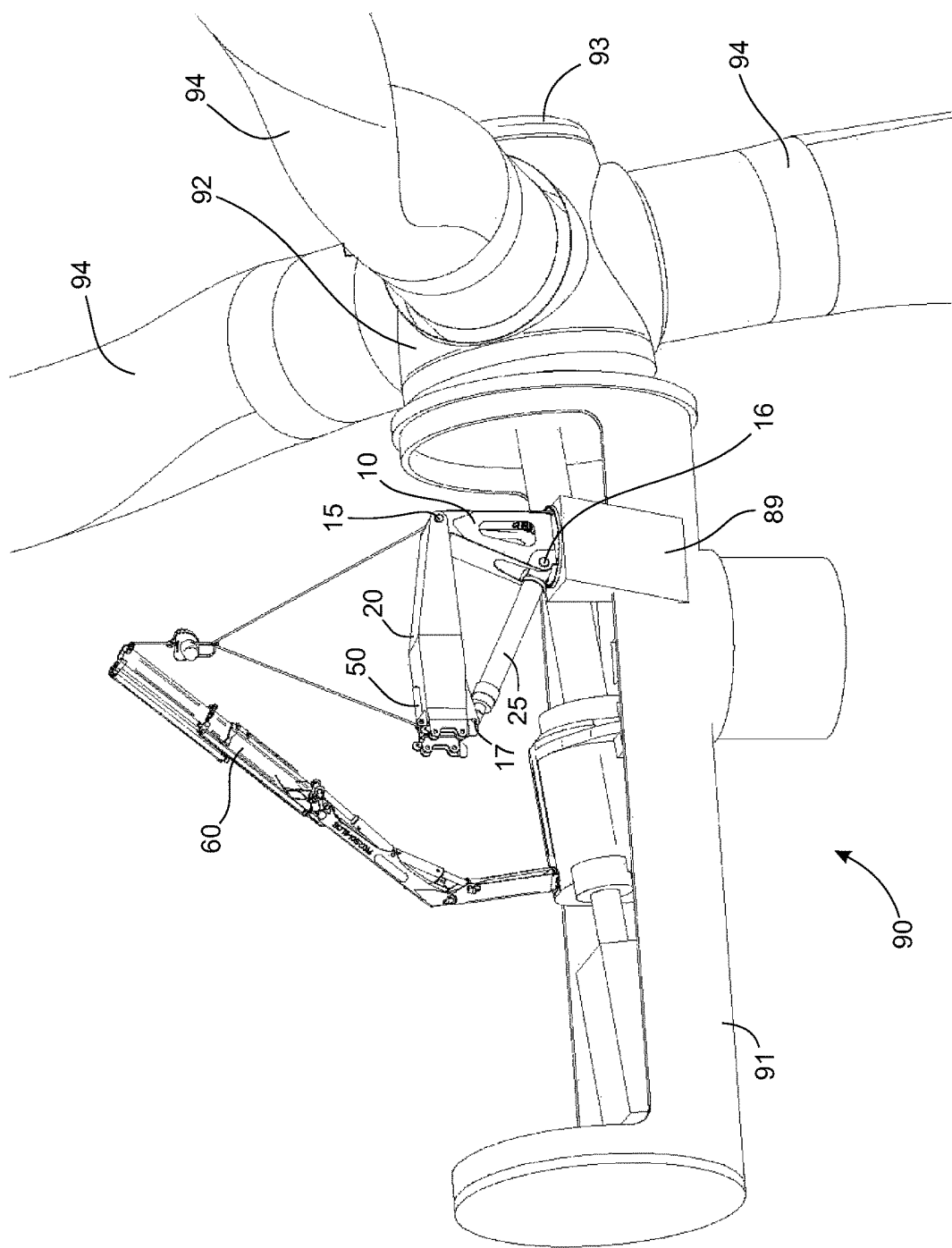
FIG. 3 depicts mounting a jib of the lift system of FIG. 1A on the base.
Figure 4:
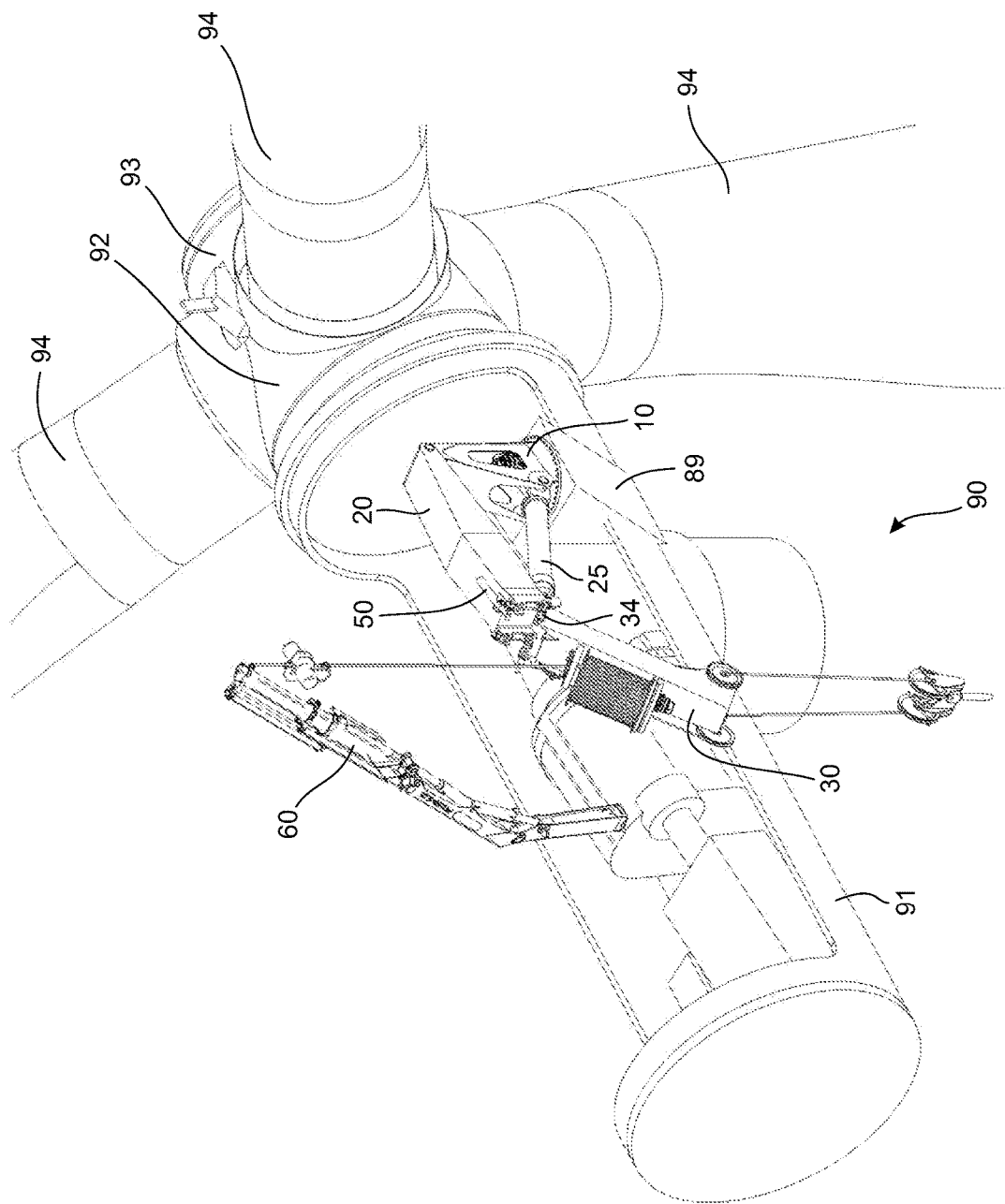
FIG. 4 depicts mounting a pre-reeved module of the lift system of FIG. 1A on the jib.
Figure 5A:
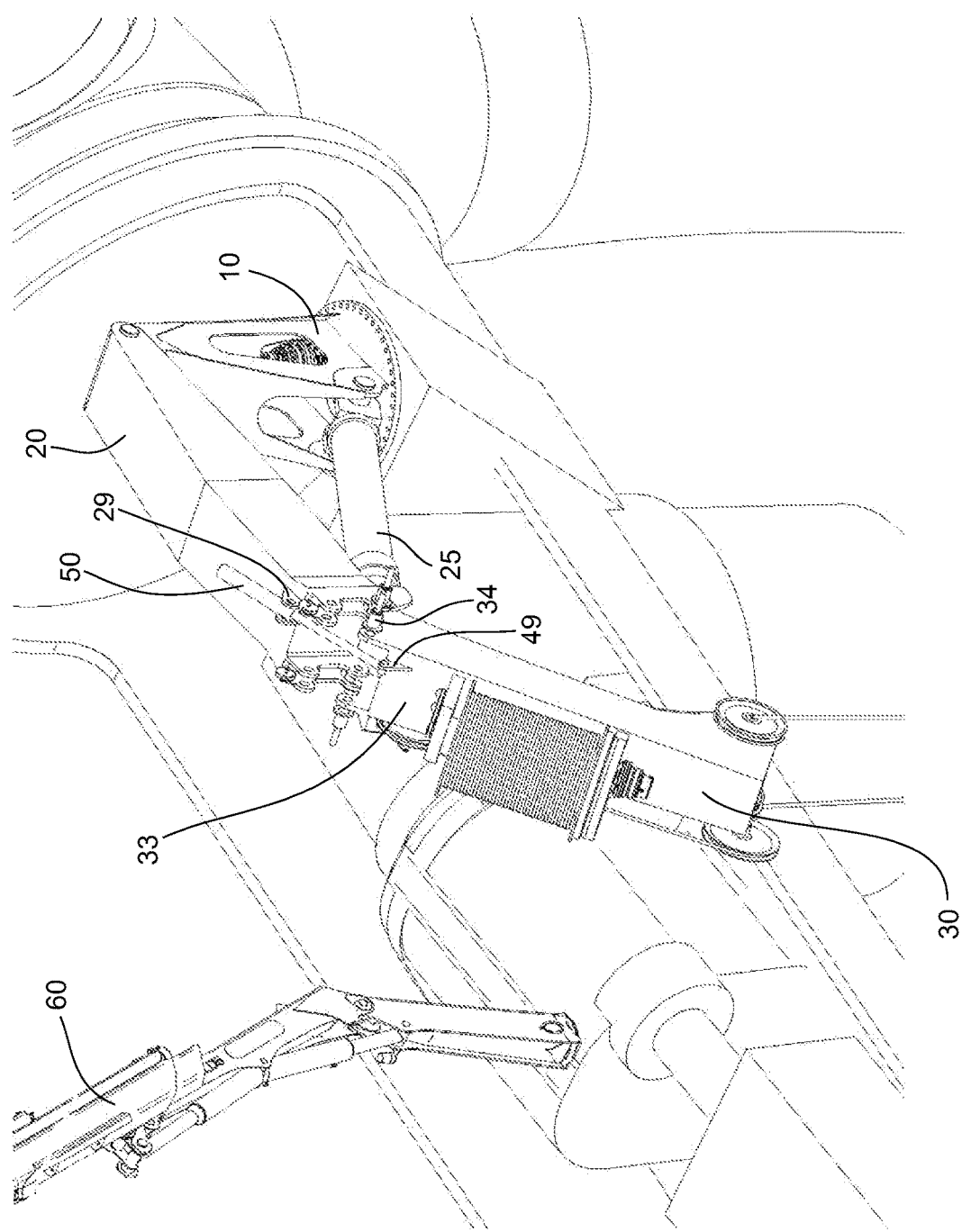
FIG. 5A depicts the lift system of FIG. 1 after connecting a boom cylinder between a boom arm of the pre-reeved module and the jib, but prior to raising the boom arm of the pre-reeved module into linear alignment with the jib.
Figure 5B:
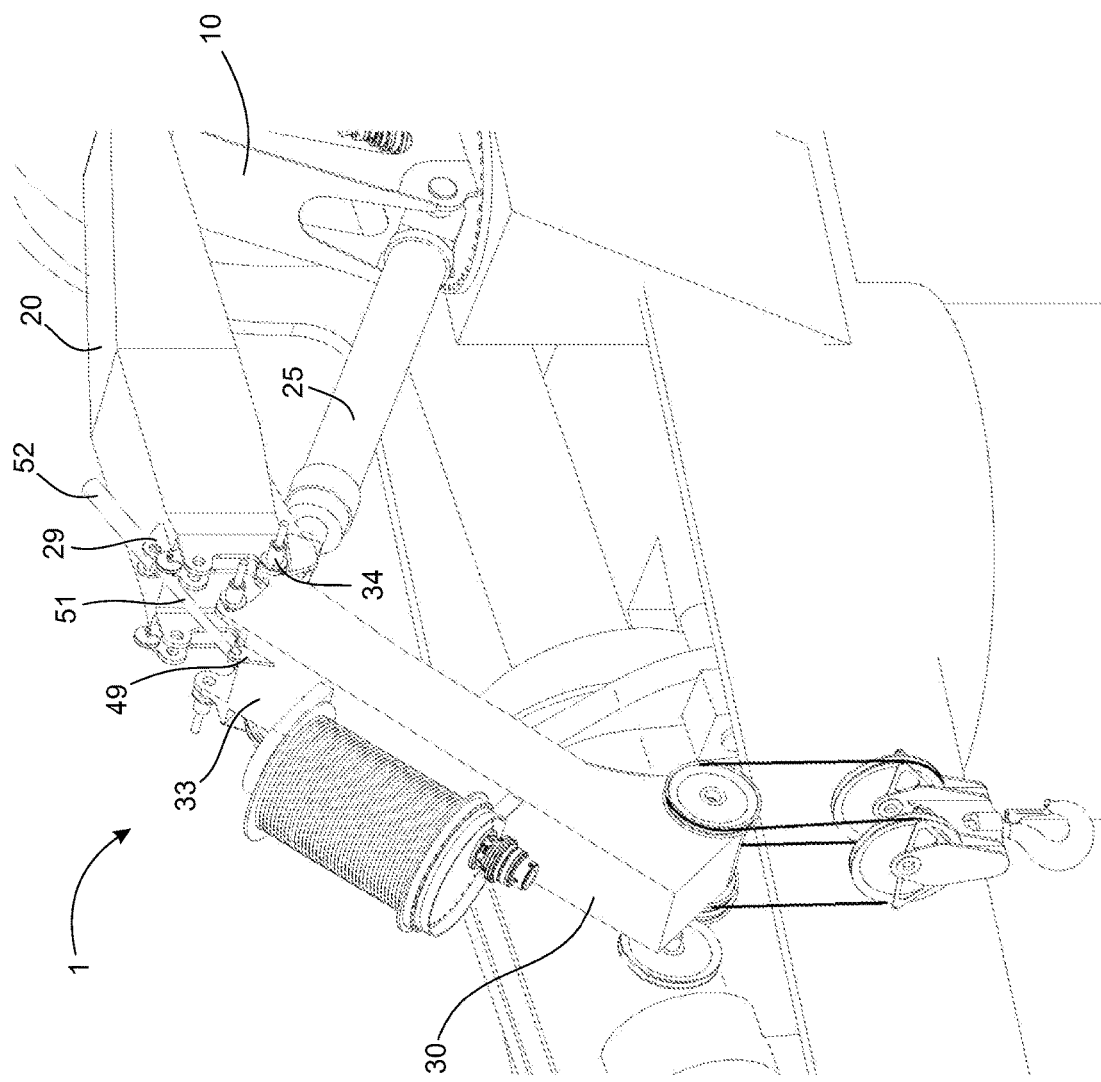
FIG. 5B is a magnified view of FIG. 5A.
Figure 6:
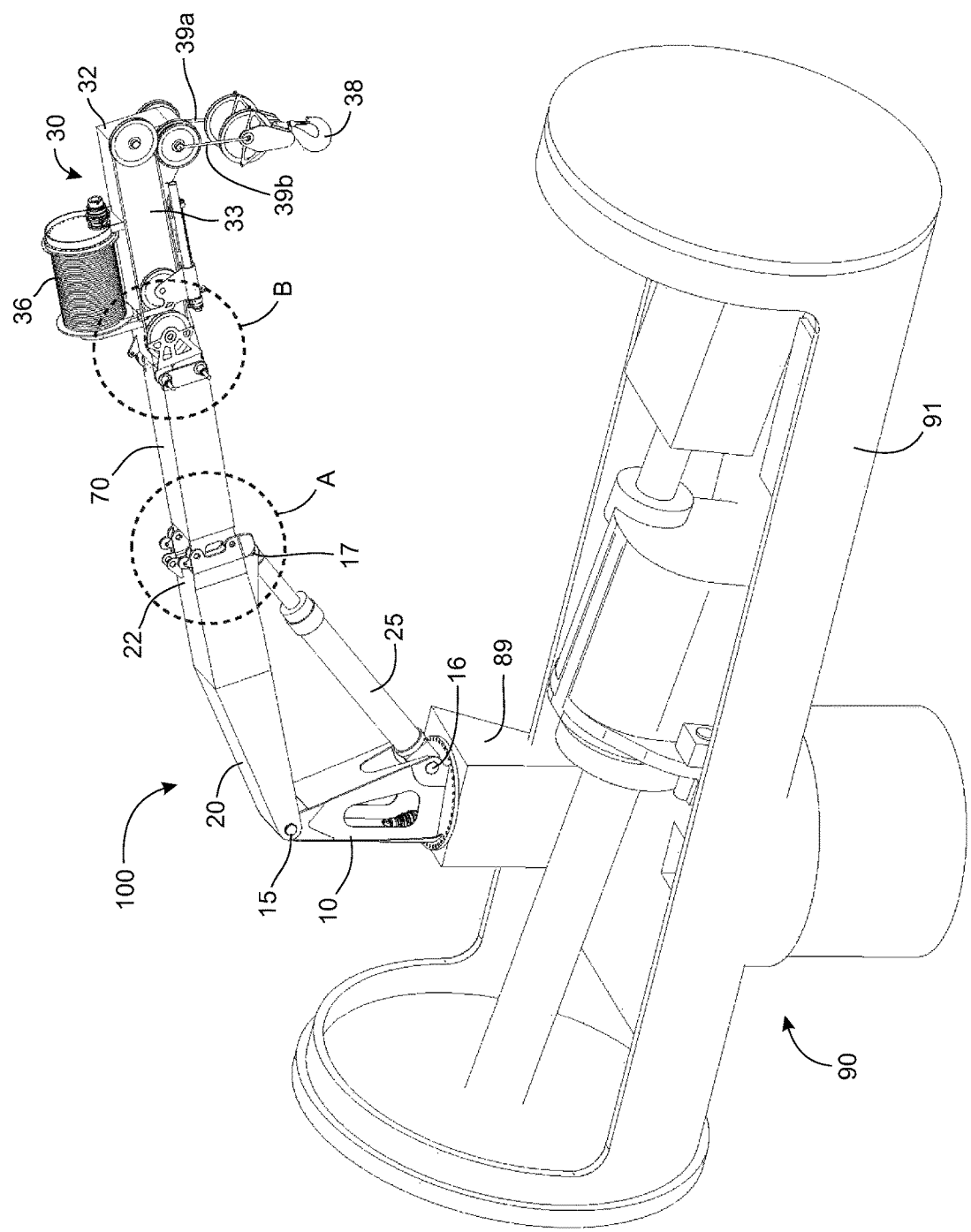
FIG. 6 depicts a variation of the lift system of the present invention mounted on a nacelle of a wind turbine.

As seen in FIG. 3, the jib 20, together with the jib actuator 25 and PRM actuator 50 connected to the jib 20, is then hoisted up to the nacelle 91 by the smaller crane 60; and, the jib 20 is pivotally connected to the base 10 with the pivot pin 15. The jib actuator 25 is pivotally connected to the proximal end 11 of the base 10 by a first jib actuator pivot pin 16, and pivotally connected to the distal end 22 of the jib 20 by a second jib actuator pivot pin 17. As seen in FIG. 4, the pre-reeved module 30 is then hoisted up to the nacelle 91 by the smaller crane 60; and, the pre-reeved module 30 is pivotally attached to the jib 20 using the PRM pivot pin 34. As seen in FIG. 5A and FIG. 5B, once the pre-reeved module 30 is pivotally attached to the jib 20, the smaller crane 60 is moved out of the way and the PRM actuator 50 is connected to the pre-reeved module 30. When the PRM actuator is a hydraulic cylinder or the like, a cylinder rod 51 of the PRM actuator 50 is extended and pivotally attached to a mounting tab 49 on the boom arm 33 of the pre-reeved module 30. A barrel 52 (see FIG. 5B) of the PRM actuator 50 is pivotally attached to a mounting bracket 29 on the jib 20. The barrel 52 is pivotally attached to the mounting bracket 29 proximate a rod end of the barrel 52 so that the other end of the barrel 52 may rise up into substantially linear alignment with the boom arm 33 of the pre-reeved module 30 when the cylinder rod 51 is first attached to the mounting tab 49. As seen in FIG. 1A and FIG. 1B, with the PRM actuator 50 connected to both the pre-reeved module 30 and the jib 20, the PRM actuator 50 is actuated, for example the cylinder rod 51 is retracted, to draw the pre-reeved module 30 up so that the PRM securing pin 35 may be used to immovably secure the pre-reeved module 30 to the jib 20. In the case of a hydraulic cylinder, retraction of the cylinder rod 51 causes the barrel 52 to pivot so that the end of the barrel 52 opposite the rod end lowers remaining in substantially linear alignment with the boom arm 33. With the pre-reeved module 30 and immovably secured to the jib 20, the jib actuator 25 is actuated, for example extended, to raise the jib 20 and the pre-reeved module 30 into a working position for hoisting very heavy turbine parts. The rotatable base 10 permits positioning the hook 38 anywhere along a circular path in a horizontal plane over the wind turbine 90 for connection to a desired part. Tilting the jib 10 using the jib actuator 25 may help position the hook 38 at different radial positions with respect to the base 10.

Dismounting the lift system 1 from the nacelle 91 may be accomplished by reversing the steps described above. Thus, the PRM securing pin 35 is removed followed by lowering the distal end 32 of the pre-reeved module 30 using the PRM actuator 50. With the distal end 32 of the pre-reeved module 30 lowered, the hoist of the smaller crane 60 connected to the pre-reeved module 30 and the PRM actuator 50 is disconnected from the pre-reeved module 30. The PRM pivot pin 34 is then removed and the pre-reeved module 30 is lowered to the ground by the smaller crane 60. The hoist of the smaller crane 60 is then connected to the jib 20 and the pivot pins 15, 16 are removed to disconnect the jib 20 from the base 10. The jib 20 is then lowered to the ground by the smaller crane 60. The hoist of the smaller crane 60 is then connected to the base 10, the base 10 is disconnected from the mounting platform 89 and the base 10 is then lowered to the ground by the smaller crane 60.

In FIG. 6 to FIG. 11, a variant lift system 100 of the nacelle-mountable lift system 1 is especially adapted to raise and lower the rotor blade 94 of the rotor 92 of the wind turbine 90, although the lift system 100 may be used to raise and lower other components of the wind turbine, especially heavy components such as the generator and gearbox. The lift system 100 is similar to the lift system 1, the main difference being the provision of an insert 70 between the jib 20 and the pre-reeved module 30. The insert 70 in effect extends the length of the jib 20 so that the distal end 32 of the boom arm 33 of the pre-reeved module 30 extends beyond the hub 93 when the lift system 100 is positioned for hoisting one of the rotor blades 94. Because the rotor 92 of the turbine 90 is tilted back relative to vertical, the lines 39a and 39b can both extend vertically downward in front of the hub 93 when the distal end 32 of the boom arm 33 is extending forwardly beyond the hub 93 without the hub 93 interfering with the lines 39a and 39b.

Figure 7:
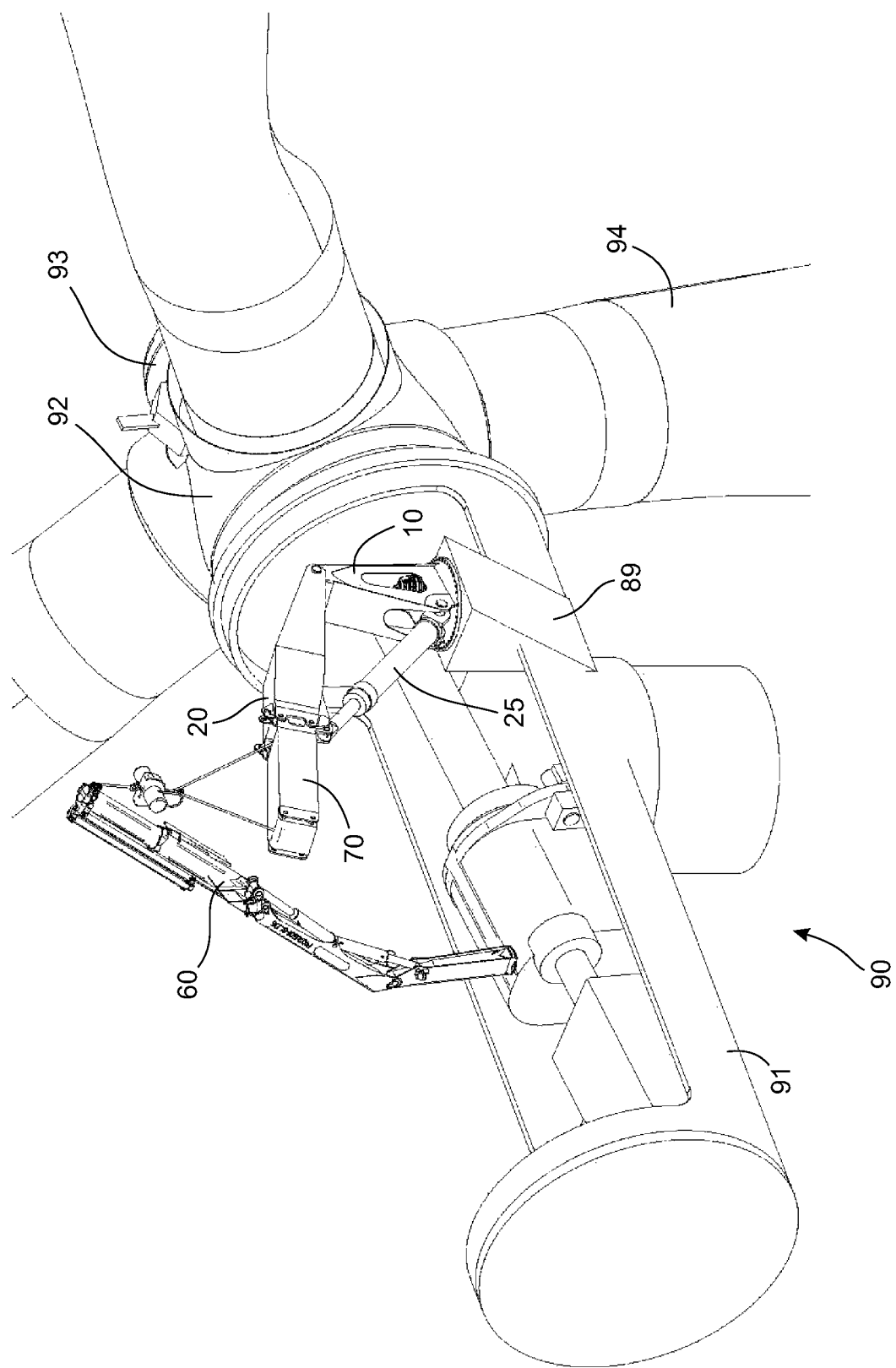
FIG. 7 depicts mounting an insert on a jib of the lift system of FIG. 6
Figure 8:
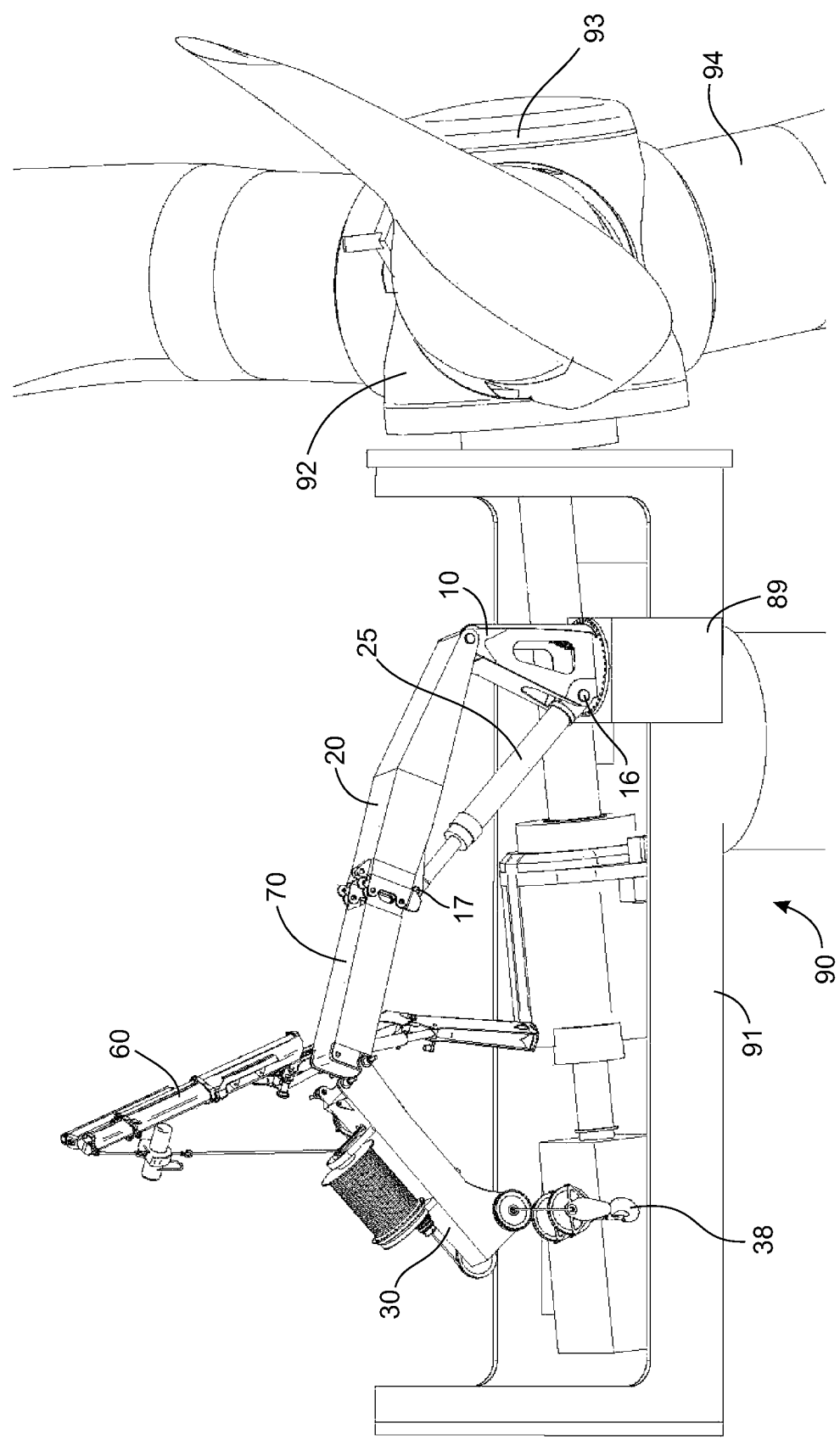
FIG. 8 depicts mounting a pre-reeved module of the lift system of FIG. 6 on the insert.
Figure 9A:
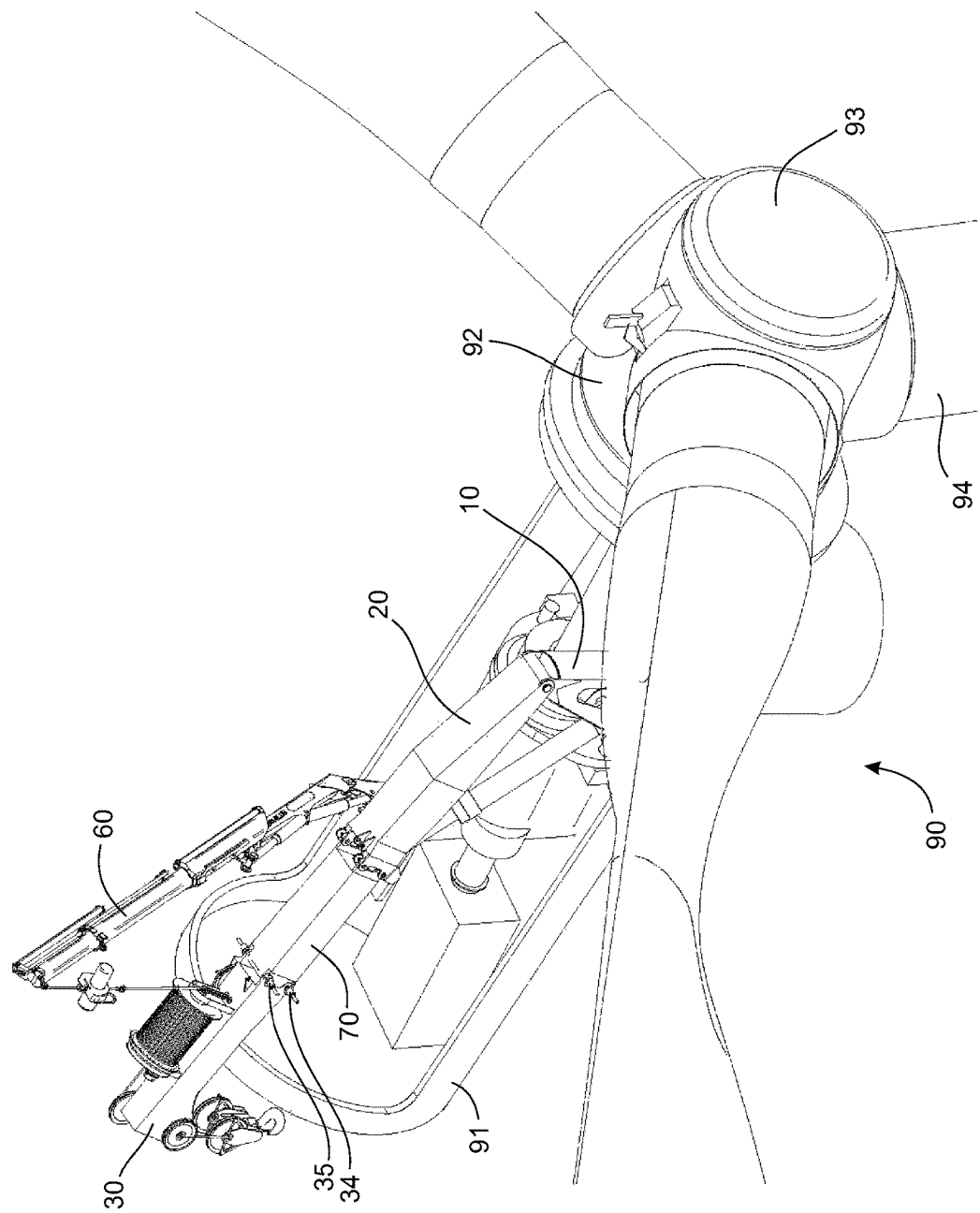
FIG. 9A depicts raising a boom arm of the pre-reeved module of the lift system of FIG. 6 into linear alignment with the jib using a knuckle boom crane.
Figure 9B:
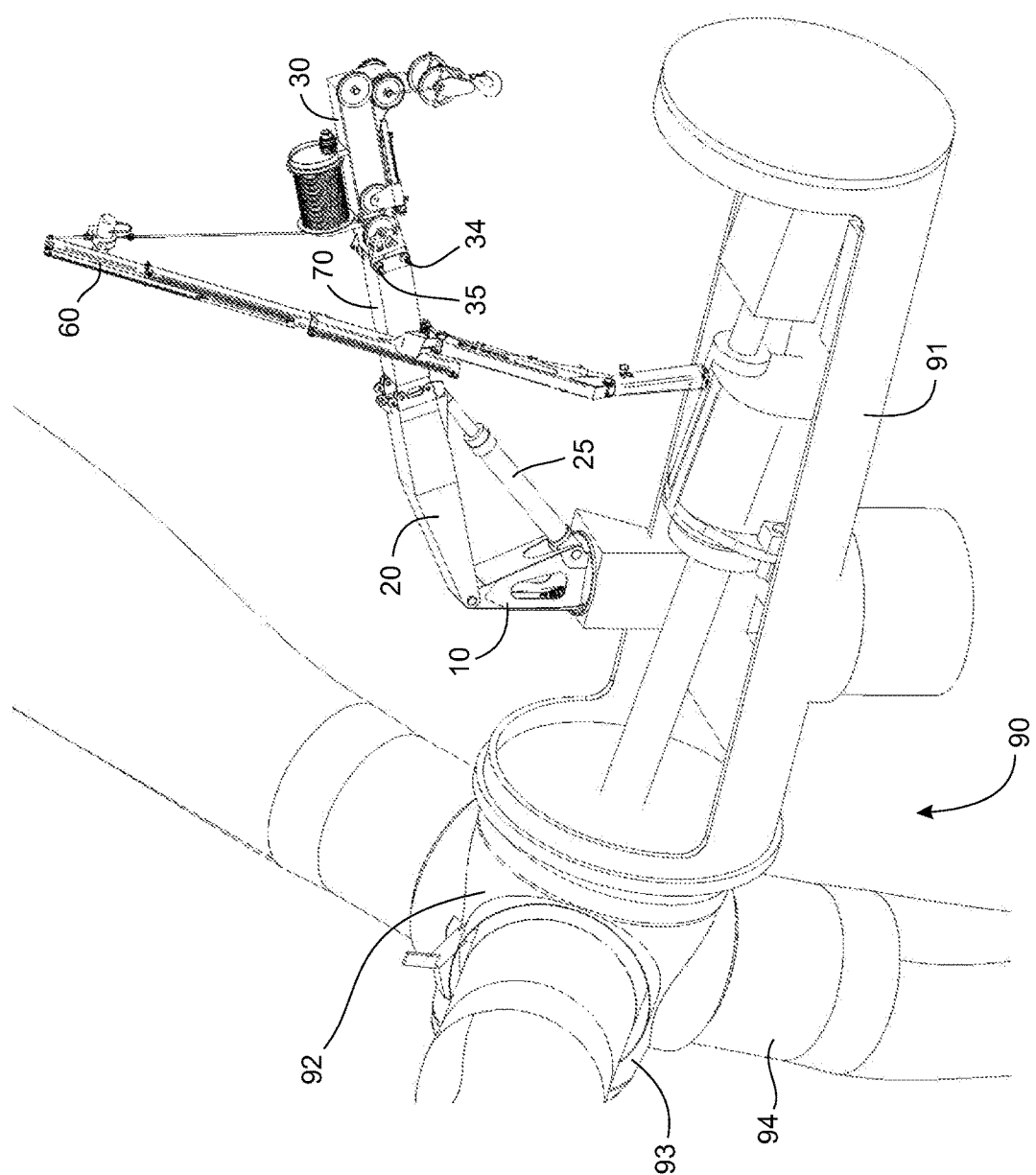
FIG. 9B is an opposite side view of FIG. 9A.
Figure 10A:
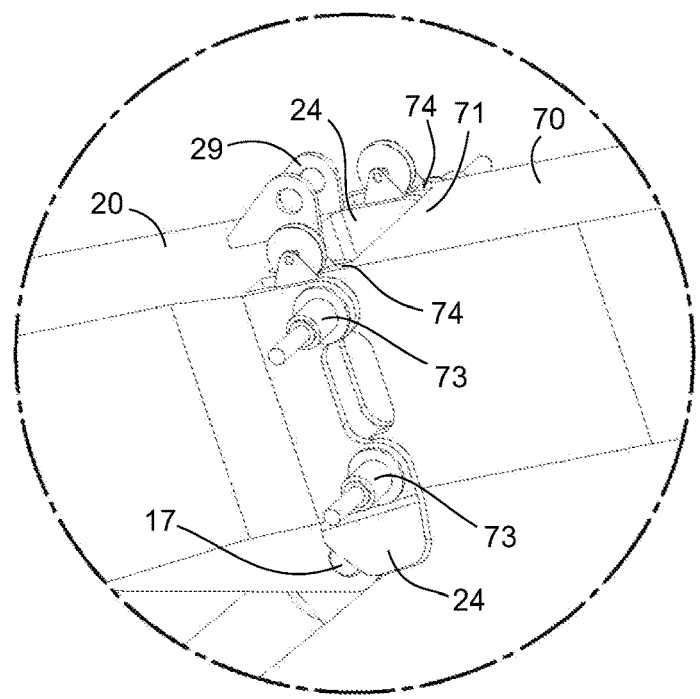
FIG. 10A is a magnified view of area A in FIG. 6.
Figure 10B:
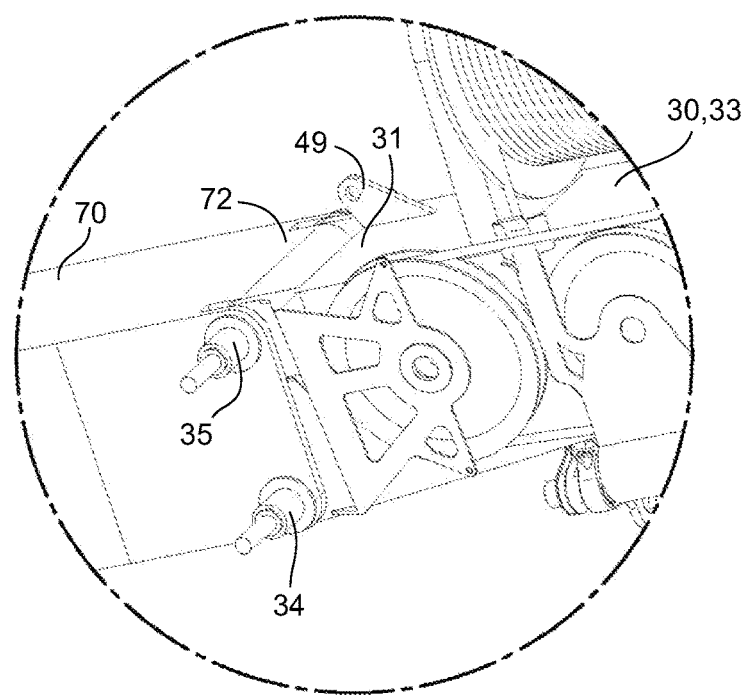
FIG. 10B is a magnified view of area B in FIG. 6.
Figure 11:
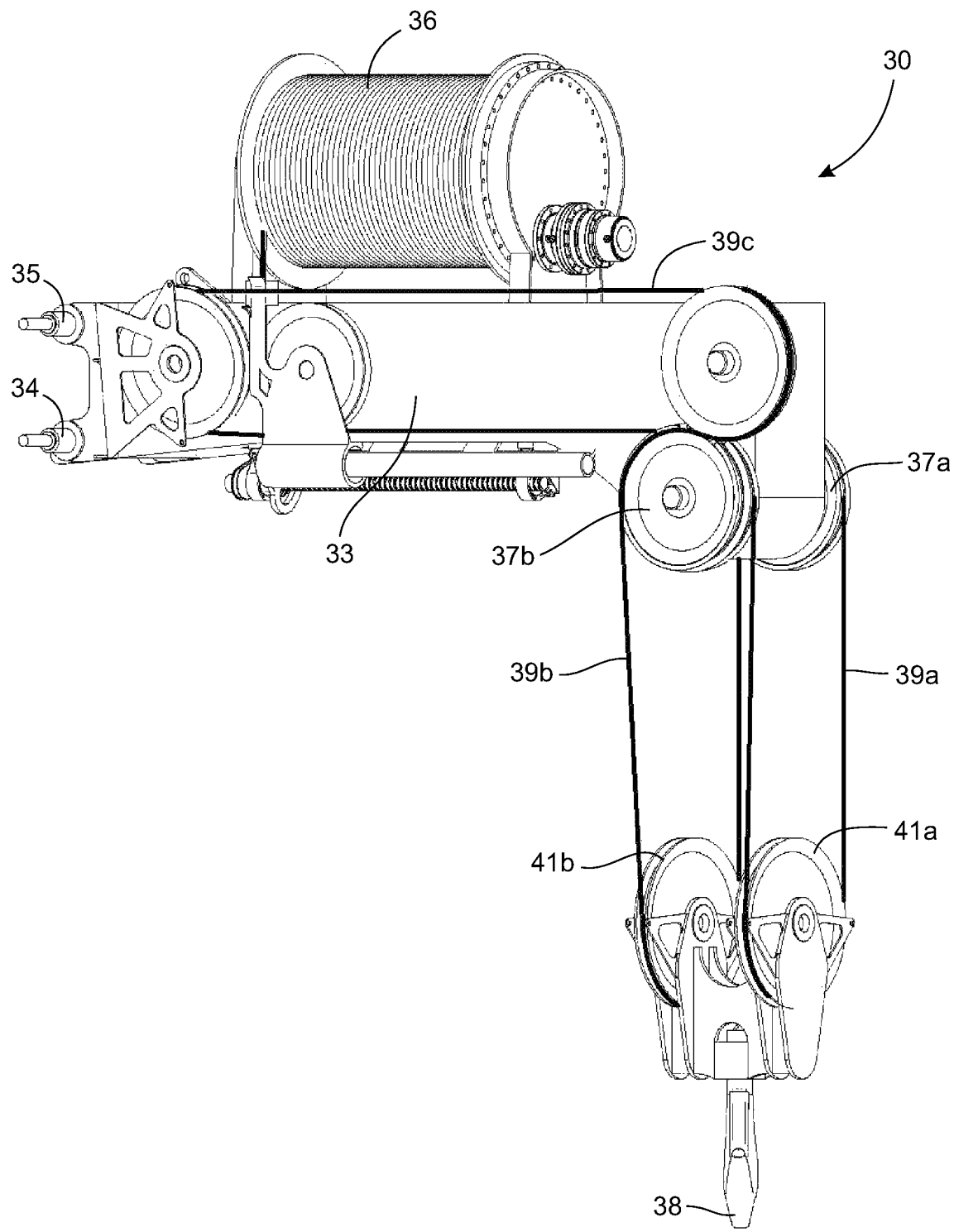
FIG. 11 depicts a magnified view of the pre-reeved module of the lift system of FIG. 6.
Figure 12:
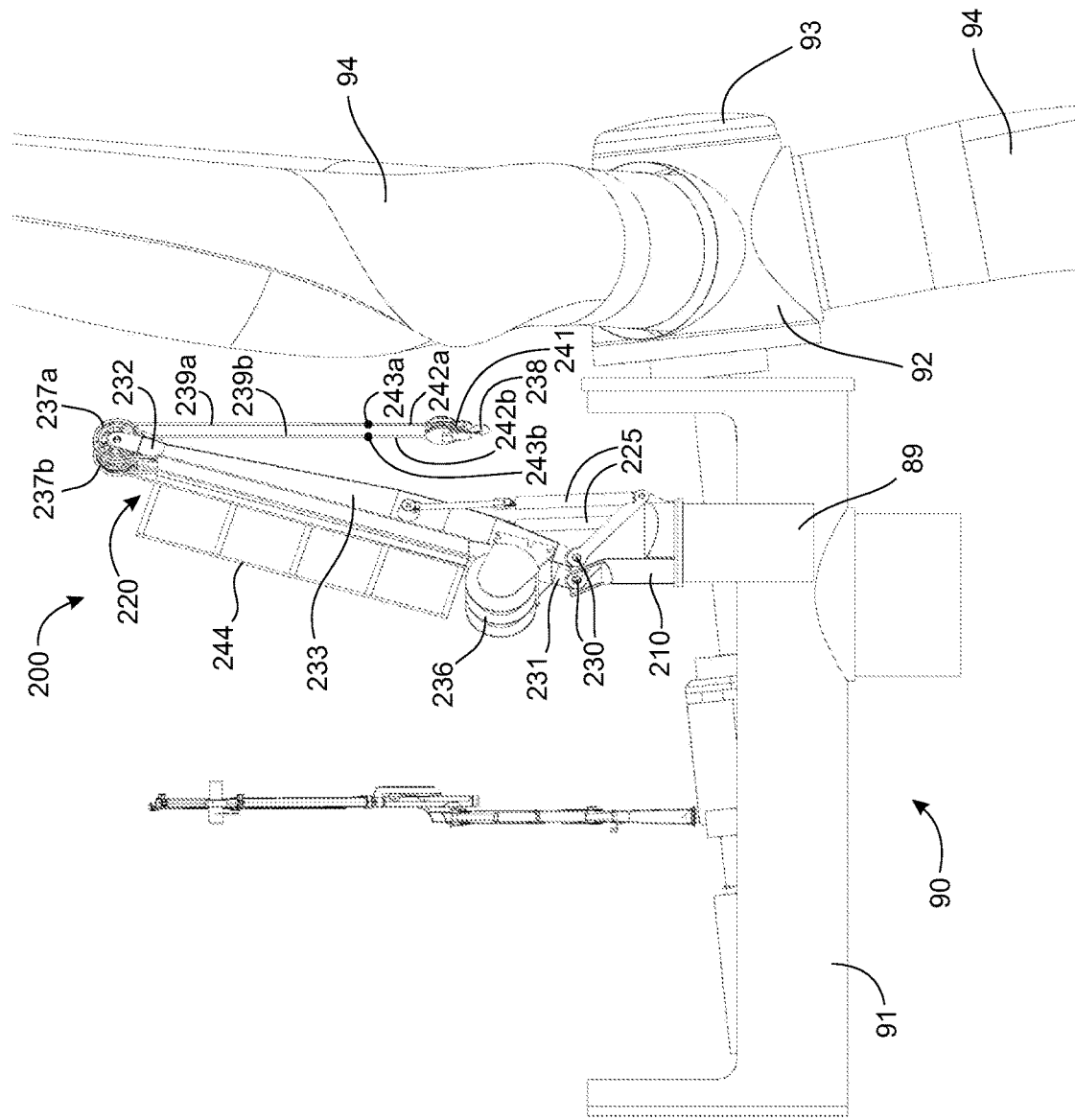
FIG. 12 depicts a side view of a variation of the lift system of the present invention mounted on a nacelle of a wind turbine.
Figure 13:
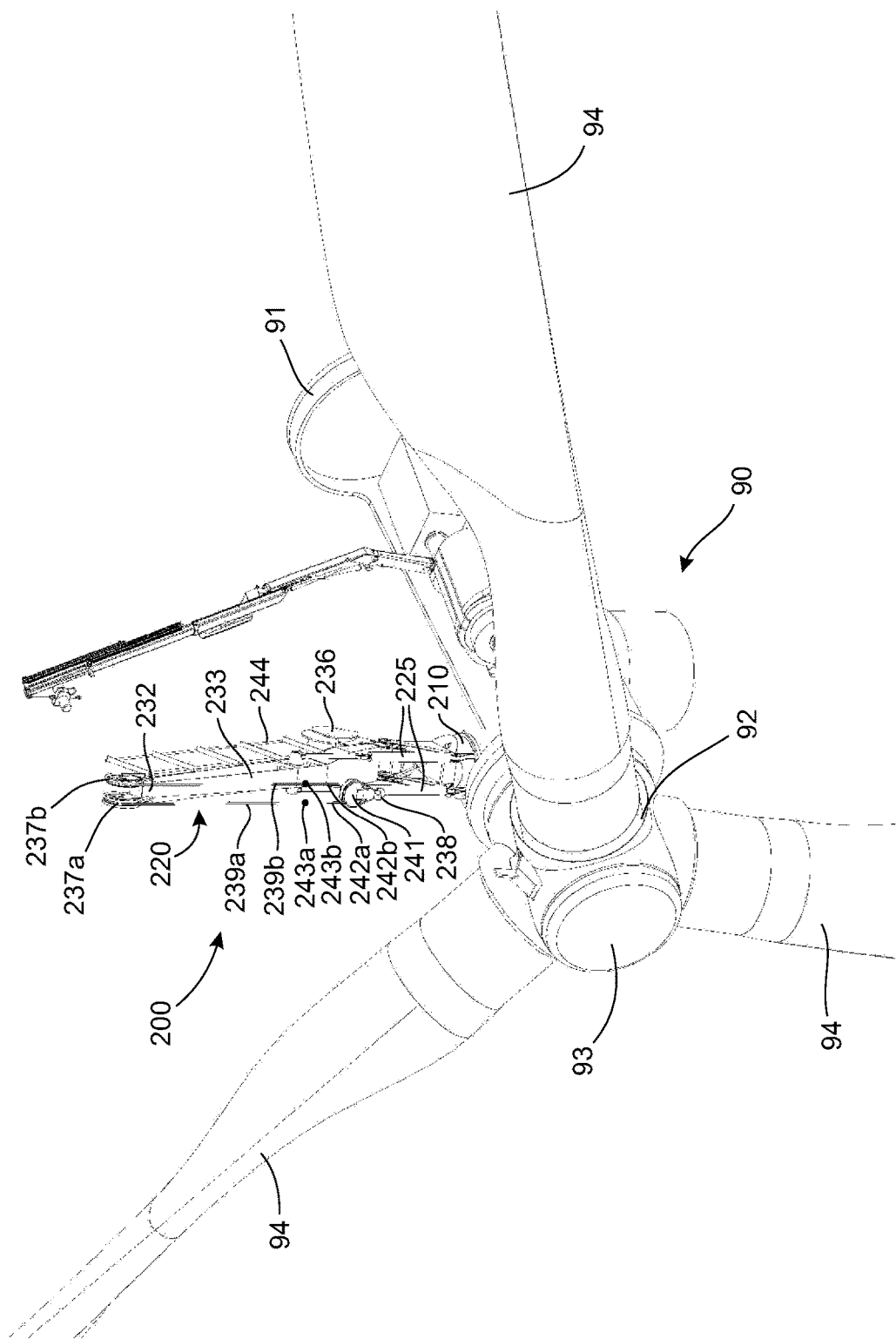
FIG. 13 depicts a front perspective view of the lift system of FIG. 12.
Figure 14:
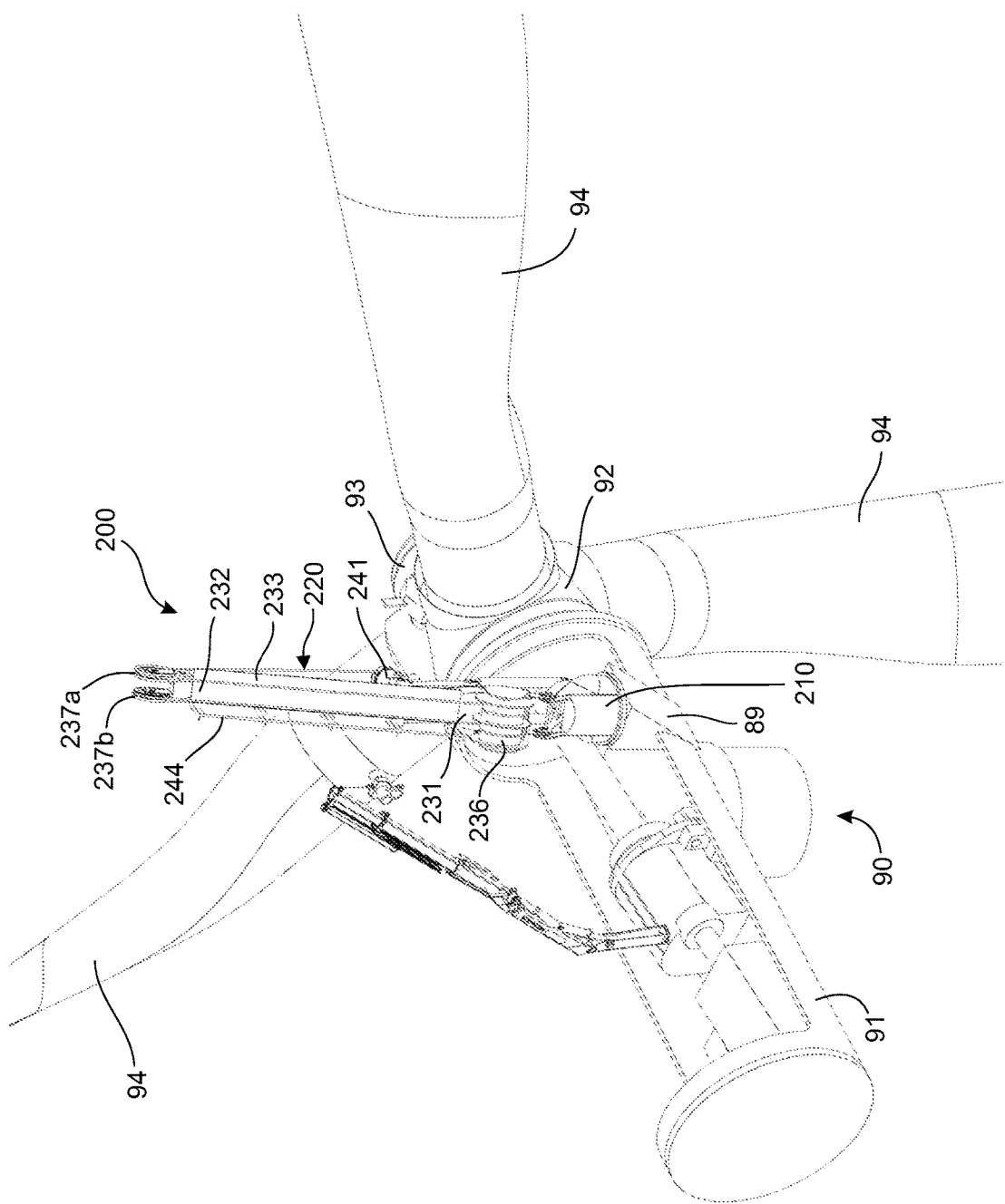
FIG. 14 depicts a rear perspective view of the lift system of FIG. 12.
Figure 15:
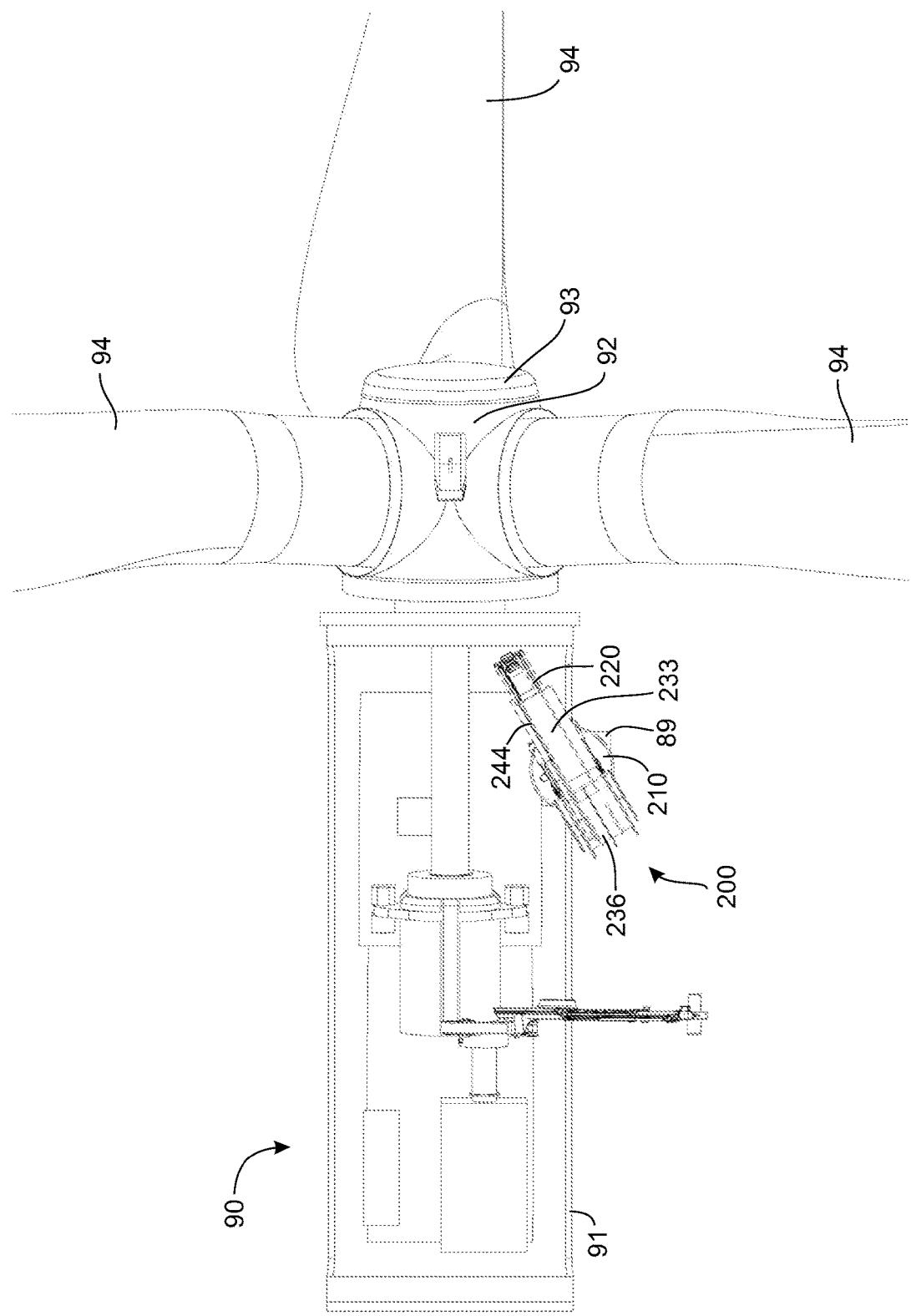
FIG. 15 depicts a top view of the lift system of FIG. 12.

Likewise, the lift system 100 may be mounted on the nacelle 91 in a manner that is the same as the method for mounting the lift system 1, except that the insert 70 is immovably mounted on the jib 20 as shown in FIG. 7 before the pre-reeved module 30 is mounted on insert 70 as shown in FIG. 8. As seen in FIG. 10A, to immovably mount the insert 70 on the jib 20, insert mounting pins 73 are inserted through aligned apertures in a pair of spaced-apart jib mounting brackets 24, the aligned apertures also aligned with corresponding aligned apertures in spaced-apart proximal mounting brackets 74 at or proximate a proximal end of the insert 70. The proximal mounting brackets 74 of the insert 70 are received between the jib mounting brackets 24. As seen in FIG. 10B, mounting the pre-reeved module 30 on the insert 70 is accomplished in the same manner as mounting the pre-reeved module 30 on the jib 20 of the lift system 1 as seen in FIG. 4. Aligned apertures in distal mounting brackets at or proximate the distal end 72 of the insert 70 and PRM mounting brackets at or proximate the proximal end 31 of the boom arm 33 of the pre-reeved module 30 are also employed to receive the PRM pivot pin 34 and the PRM securing pin 35.

In FIG. 12, FIG. 13, FIG. 14 and FIG. 15, a lift system 200 is depicted, which is another embodiment of a nacelle-mountable lift system especially adapted to raise and lower the rotor blade 94 of the rotor 92 of the wind turbine 90, although the lift system 200 may be used to raise and lower other components of the wind turbine, especially heavy components such as the generator and gearbox.

The lift system 200 comprises a jib 220 mounted on and extending generally laterally from a base 210, the base 210 mountable on the mounting platform 89 situated proximate a front end of the nacelle 91 proximate to and behind the hub 93 of the rotor 92 of the wind turbine 90. The rotor blades 94 are mounted on the hub 93 arrayed around the hub 93 and extending laterally away from an axis of rotation of the hub 93. The base 210 is rotatable about a vertical axis to permit re-orientation of the lateral direction in which the jib 220 extends.

The jib 220 comprises a boom arm 233 having a proximal end 231 pivotally connected to the base 210 by pivot pins 230 so that the boom arm 233, and therefore the entire jib 220, can pivot about a horizontal axis through the pivot pins 230. Pivoting of the boom arm 233 about the horizontal axis permits raising and lowering of a distal end 232 of the boom arm 233. A pair of hydraulic cylinders 225 are pivotally attached to and extend between opposed sides of the base 210 and opposed sides of the boom arm 233. Extension and retraction of hydraulic cylinders 225 raises and lowers the distal end 232 of the boom arm 233. The hydraulic cylinders 225 are pivotally connected to the sides of the boom arm 233 at positions closer to the proximal end 231 than the distal end 232 of the boom arm 233.

Figures 24A, 24B, 24C:
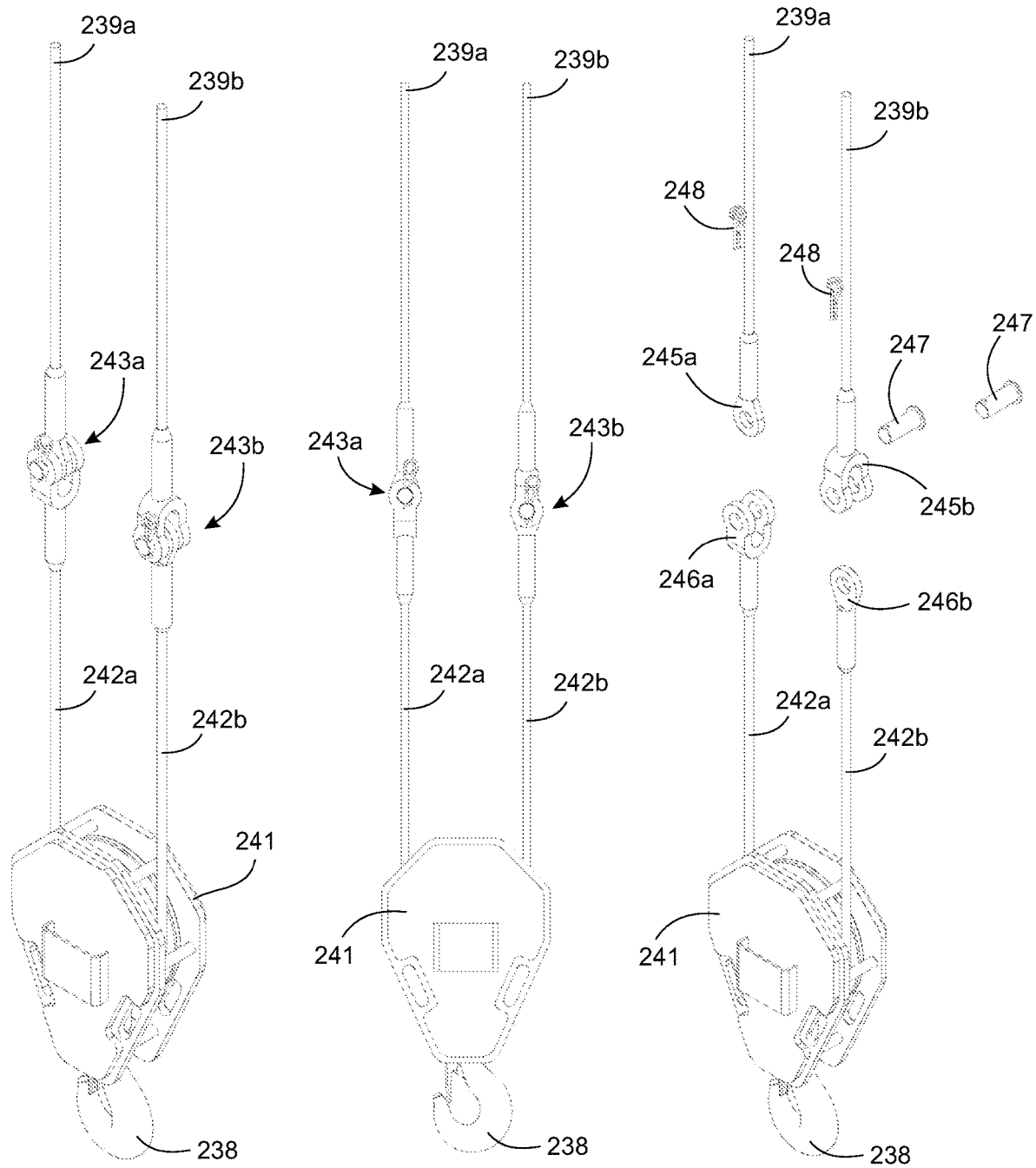
FIG. 24A depicts a perspective view of a hook block showing grommet structures connecting lift cables to hook block cables'
FIG. 24B is a side view of FIG. 24A.
FIG. 24C depicts the hook block of FIG. 24A with the grommet structures disconnected.

The jib 220 further comprises a double drum winch 236 mounted atop the boom arm 233 at the proximal end 231 of the boom arm 233. The double drum winch 236 is positioned on the boom arm 233 vertically directly above the base 210 so that the base 210 can support the weight of the winch 236, thereby relieving the hydraulic cylinders 225 of the need to support the winch 236 when raising and lowering the boom arm 233. A pair of opposed spaced-apart sheaves 237a and 237b are rotatably mounted at or proximate the distal end 232 of the boom arm 233. A hook block 241 comprising a hook 238 is connected to the winch 236 by a pair of lift cables 239a, 239b, the lift cables 239a, 239b wound around respective drums of the double drum winch 236. The hook block 241 comprises a pair of opposed hook block sheaves through which a pair of hook block cables 242a, 242b are permanently installed. With specific reference to FIG. 24A, FIG. 24B and FIG. 24C, the lift cables 239a, 239b and the hook block cables 242a, 242b are connected at respective grommet structures 243a, 243b, grommet structures 243a, 243b each comprising grommets 245a, 245b on the lift cables 239a, 239b, respectively, complementary with grommets 246a, 246b on the hook block cables 242a, 242b, respectively, which are connected together by grommet pins 247 having apertures for receiving cotter pins 248. Operation of the winch 236 raised and lowers the hook block 241 with the hook 238. The grommet structures 243a, 243b do not move much relative to the hook 238 because the two drums of the double drum winch 236 are on the same shaft, i.e. the boom arm 233. The present grommet structure arrangement is easier to use that the conventional mounting arrangement of a hook block to a cable. The conventional arrangement requires the end plate of the hook block to be removed in order to reeve the cable through the hook block followed by reinstallation of the plate.

When assembling the lift system 200, the hook block 241 is connected to the lift cables 239a, 239b with the aid of light weight high strength ropes tied to the ends of the lift cables 239a, 239b. The ropes are tied to the lift cables 239a, 239b when the lift cables 239a, 239b are fully wound on the respective drums, and an operator walks the ropes to the distal end of the boom arm 233 where the ropes are reeved over the opposed sheaves 237a, 237b and lowered to the ground. A walkway railing 244 mounted atop the boom arm 233 assists the operator in walking along the boom arm 233 to perform the operation. An operator on the ground at the base of the wind turbine 90 can then pull the ropes to draw the lift cables 239a, 239b over the sheaves 237a, 237b and pull the ends of the lift cables 239a, 239b to the ground where the lift cables 239a, 239b are connected to the hook block 241.

FIG. 16 to FIG. 23 illustrate a procedure for de-erecting the rotor blade 94 from the wind turbine 90 using the lift system 100. It is understood that the lift systems 1 or 200 could be used instead for de-erecting the rotor blade from the wind turbine in a similar manner.

Figure 16:
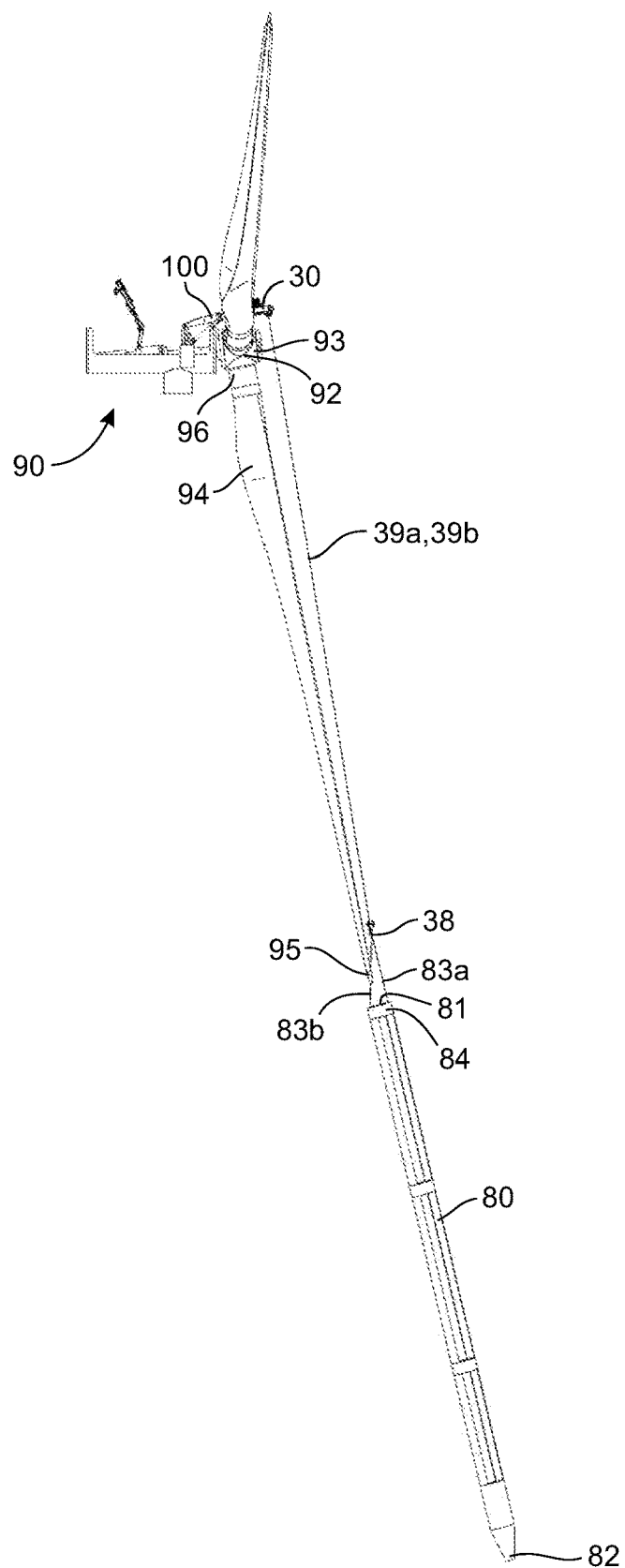
FIG. 16 depicts the lift system of FIG. 6 mounted on the nacelle with pre-reeved module extending forward of a hub of a rotor of the wind turbine, a hook of the pre-reeved module connected to a blade sheath in position below a tip of a rotor blade of the rotor.
Figure 17:
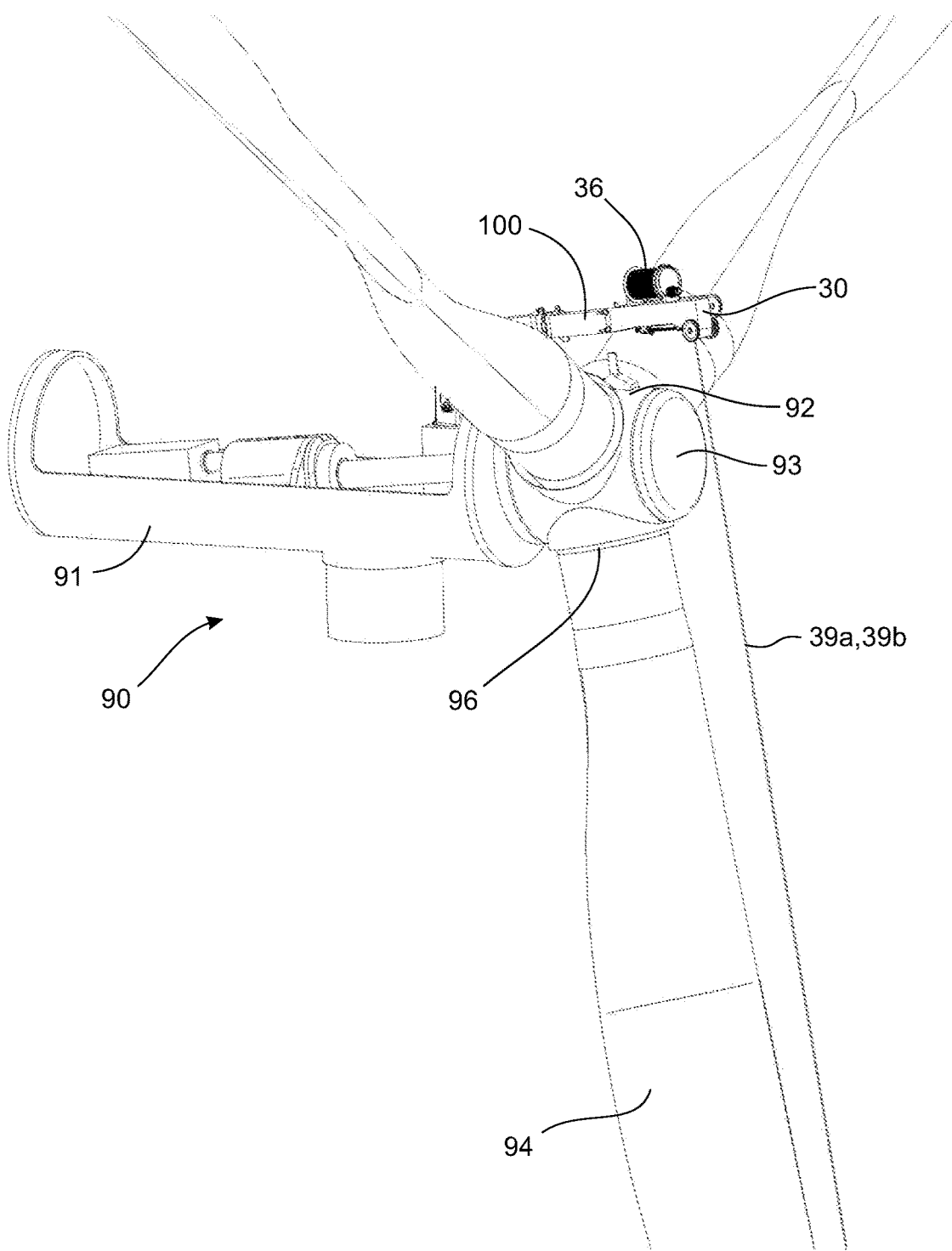
FIG. 17 is a magnified view of the pre-reeved module of the lift system of FIG. 16 extending past the hub of the rotor.

As shown in FIG. 16, at the beginning of the procedure, the rotor 92 is turned so that a tip 95 of the rotor blade 94 is at a closest point to the base of the wind turbine and the rotor blade 94 is still connected to the hub 93 at a root 96 of the rotor blade 94. As shown in FIG. 16 and FIG. 17, the distal end of the boom arm of the pre-reeved module 30 of the lift system 100 is deployed to extend forward over and beyond the hub 93 of the rotor 92. Because the rotor 92 is tilted backward, the lines 39a and 39b extending downward from the pre-reeved module 30 pass in front of the hub 93 while extending toward the tip 95 of the rotor blade 94, the tip 95 also being forward of the hub 93 due to the backward tilt of the rotor 92.

Figure 18:
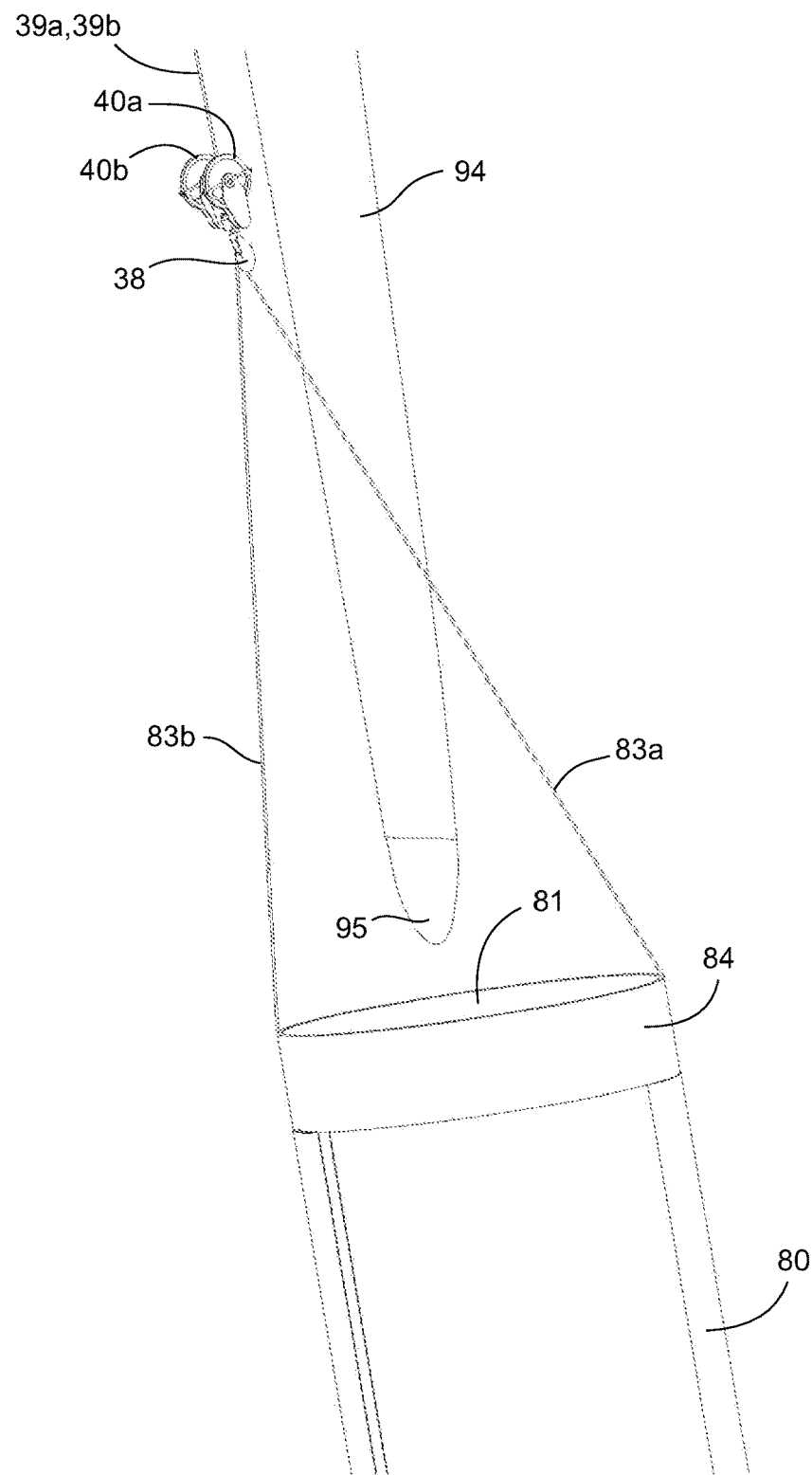
FIG. 18 is a magnified view of the hook of the pre-reeved module connected to the blade sheath in position below the tip of the rotor blade as depicted in FIG. 16.

At the end of the lines 39a and 39b, the hook 38 is connected to a blade sheath 80 through sheath lines 83a, 83b. The sheath lines 83a, 83b may be separate lines or a single contiguous line where the lines 83a, 83b are portions of the single contiguous line on either side of the hook 38. The hook 38 is first connected to the sheath lines 83a, 83b while the blade sheath 80 is lying on the ground or on a bed of a transport vehicle in a position in front of the hub 93. The hook 38 is lowered to the blade sheath 80 by activating the winch 36. After connecting the hook 38 to the sheath lines 83a, 83b, the winch 36 is activated to raise the hook 38, which raises an open top end 81 of the blade sheath 80 toward the tip 95 of the rotor blade 94, as seen in FIG. 16 and FIG. 18. The position of the pre-reeved module 30 of the lift system 100 is coordinated with the position of the tip 95 of the rotor blade 94 so that as the winch 36 raises the hook 38, the open top end 81 of the blade sheath 80 rises up to the tip 95 so that the tip 95 is received by the blade sheath 80 through the open top end 81.

In one embodiment, the blade sheath 80 comprises an elongated case having the open top end 81 and a bottom end 82. The bottom end 82 may be open or closed. The blade sheath 80 is configured to retain the rotor blade 94 when the rotor blade 94 is in the blade sheath 80. In one embodiment, the bottom end 82 may be open sufficiently to permit the tip 95 of the rotor blade 94 to pass out through the bottom end 82, but as a wider portion of the rotor blade 94 encounters the bottom end 82, the bottom end is insufficiently open to permit passage of the wider portion thereby retaining the rotor blade 94 in the blade sheath 80.

The blade sheath 80 is connectable to the hook 38 by the sheath lines 83a, 83b attachable to the top end 81 of the blade sheath 80 on opposite sides of the sheath 80. As illustrated in FIG. 18, in one embodiment, the top end 81 of the blade sheath 80 may comprise a rigid open collar 84 keeping the top end 81 open, and the sheath lines 83a, 83b may be attached to the collar 84 on opposed sides of the collar 84. The sheath lines 83a, 83b are attached to the collar 84 in a manner to provide the tip 95 of the rotor blade 94 unimpeded access into the open collar 84. The hook 38 is preferably attached to the sheath lines 83a, 83b at a position whereby the weight of the blade sheath 80 is balanced on either side of the hook 38. In some embodiments, the sheath lines 83a, 83b are equal in length.

Figure 19:
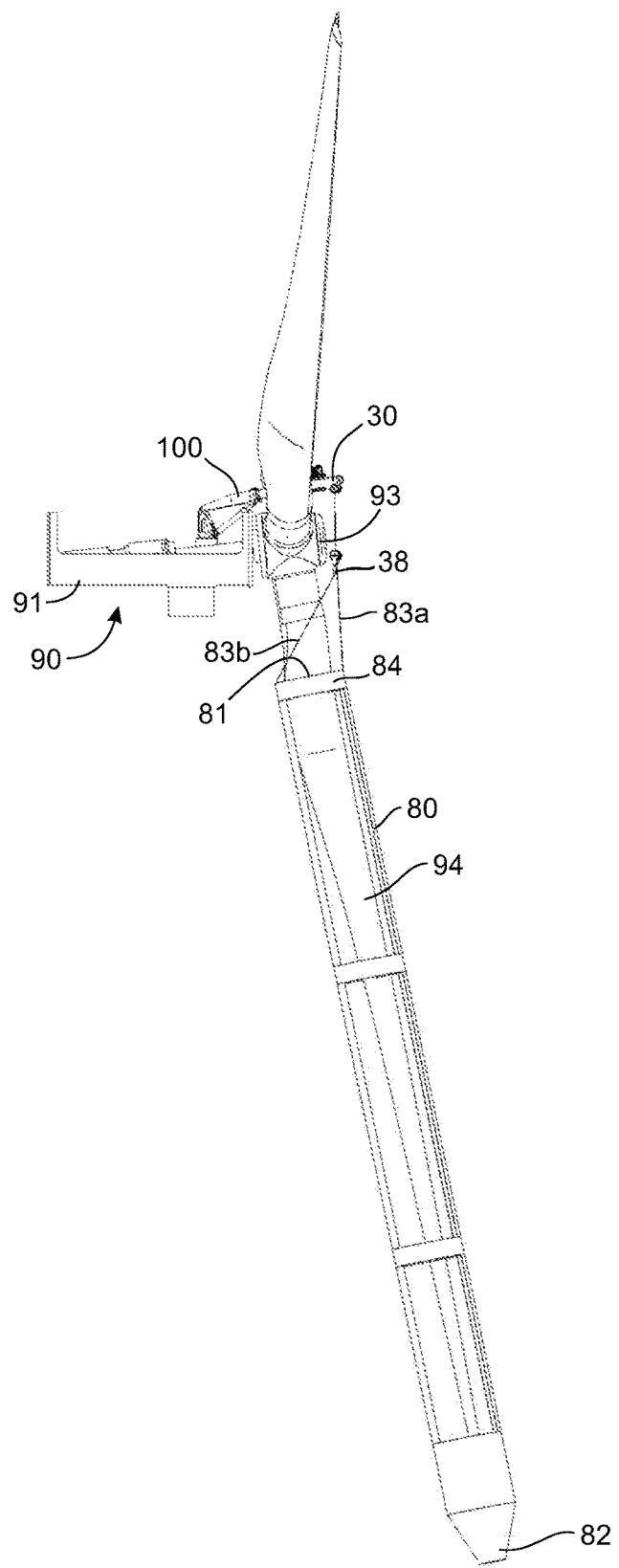
FIG. 19 depicts the lift system of FIG. 16 with the blade sheath drawn up to contain the rotor blade.
Figure 20:
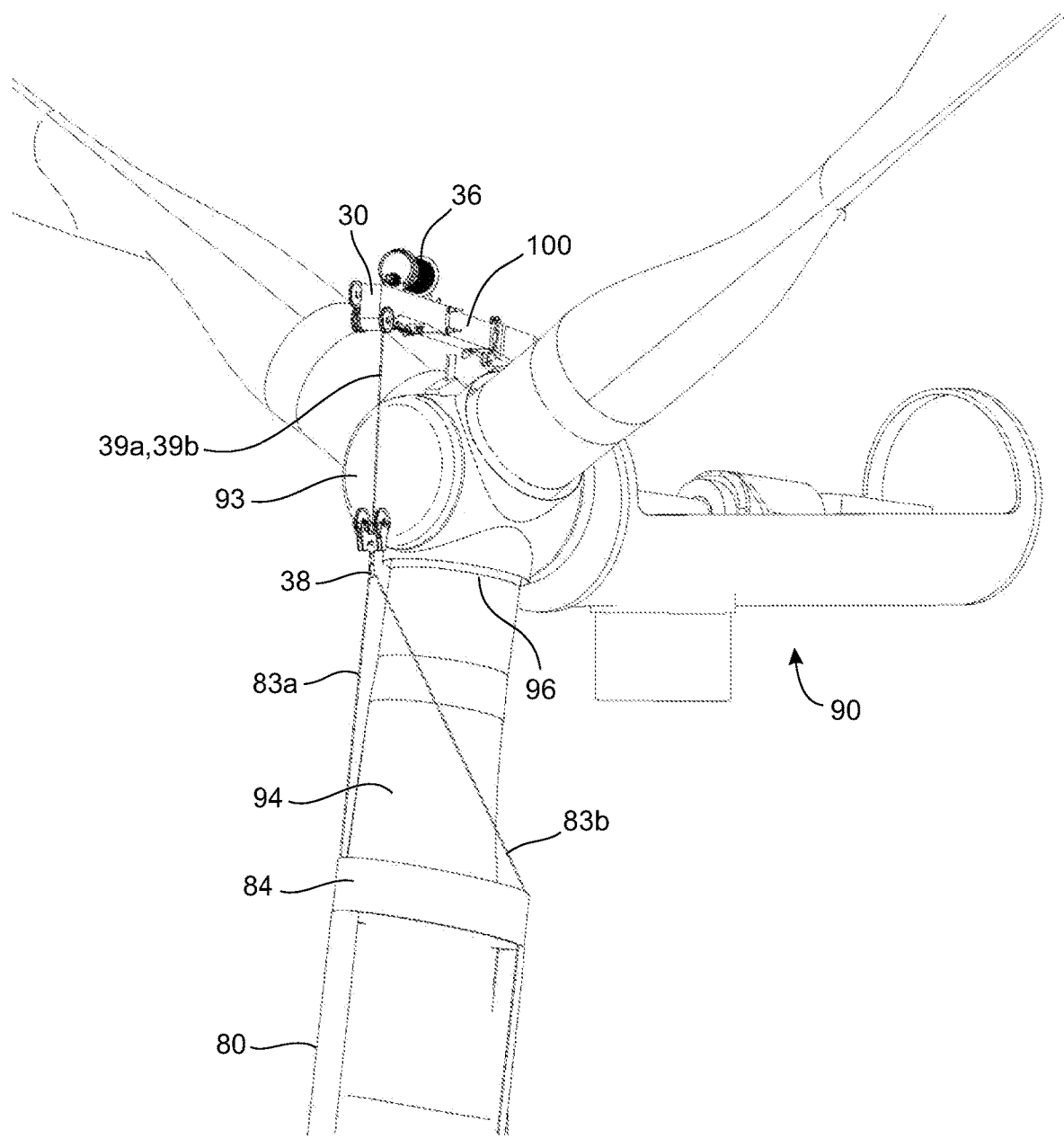
FIG. 20 is a magnified view of FIG. 19 at a root of the rotor blade showing the rotor blade contained in the blade sheath.
Figure 21:
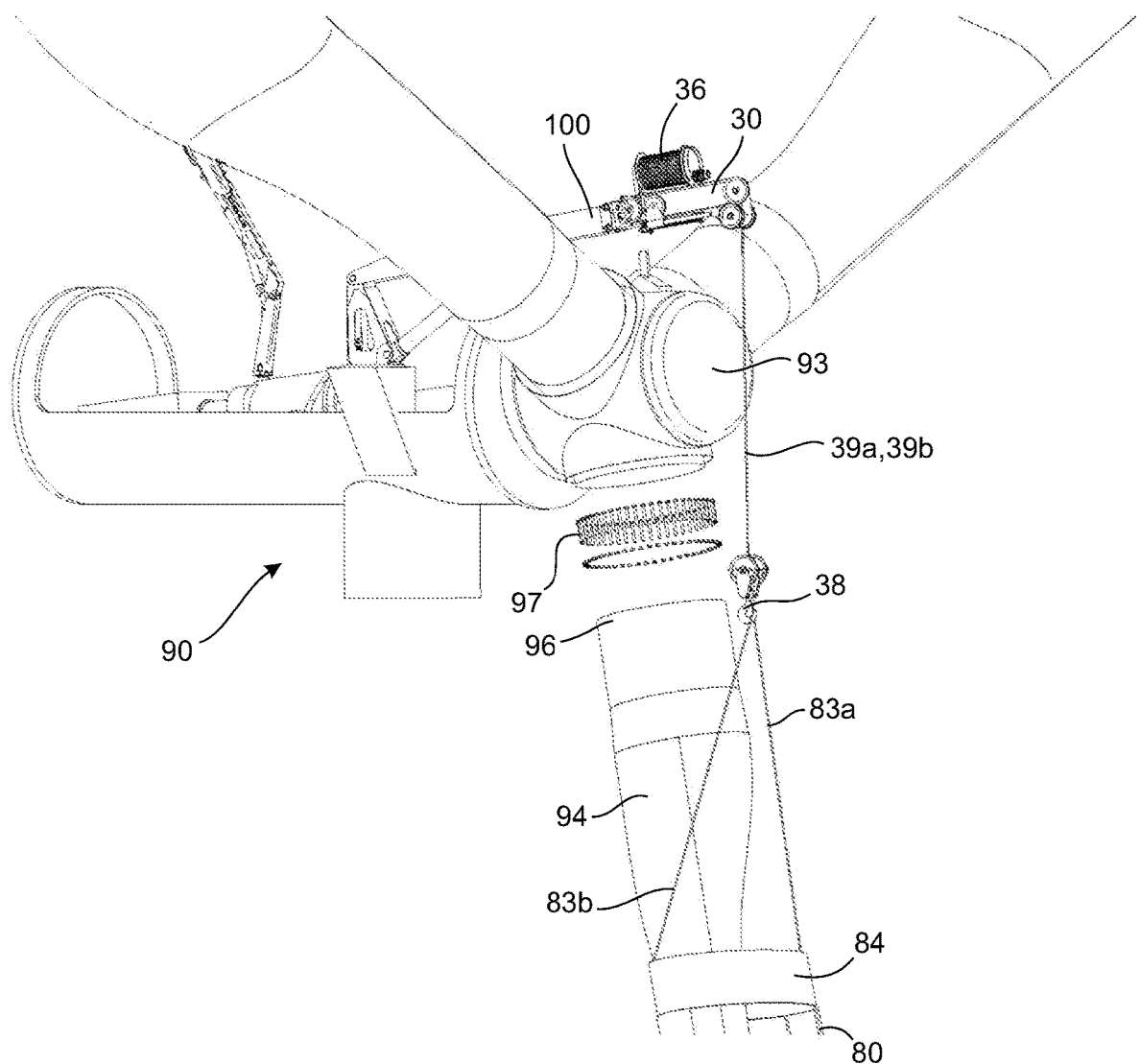
FIG. 21 depicts the rotor blade disconnected from the hub, the rotor blade contained in the blade sheath proximate the hub.

As the winch 36 raises the blade sheath 80, the rotor blade 94 becomes sheathed in the blade sheath 80 to be retained therein as shown in FIG. 19 and FIG. 20. Once the rotor blade 94 is sheathed in the blade sheath 80 to be retained therein, the rotor blade 94 is disconnected from the hub 93 at the root 96 of the rotor blade 94 as shown in FIG. 21. The rotor blade 94 is disconnected by removing the bolts 97 that connect the root 96 to the hub 93.

Figure 22:
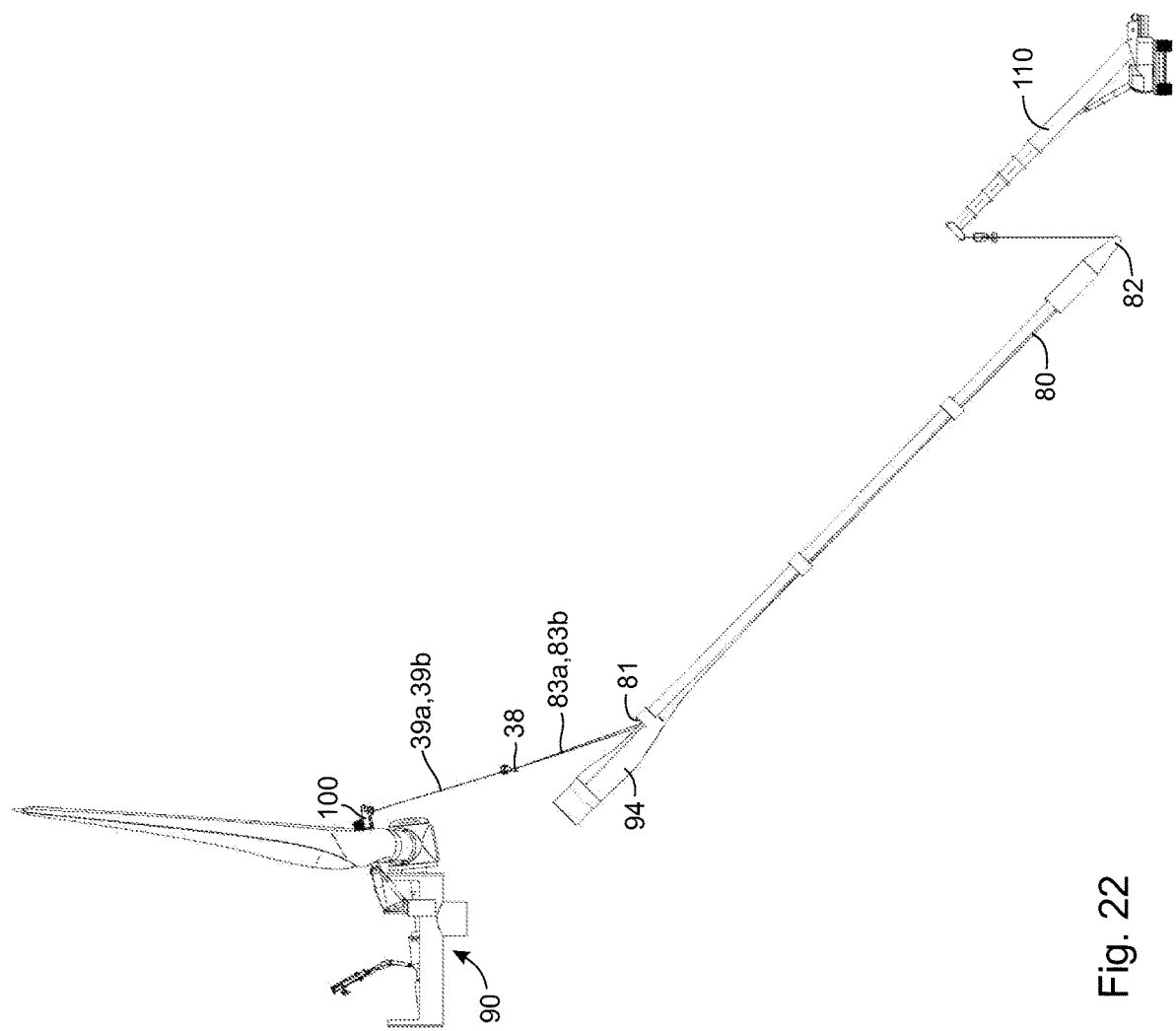
FIG. 22 depicts the rotor blade contained in the blade sheath being lowered toward the ground by the lift system of FIG. 6 with assistance of a tailing crane connected to a bottom end of the blade sheath.
Figure 23:
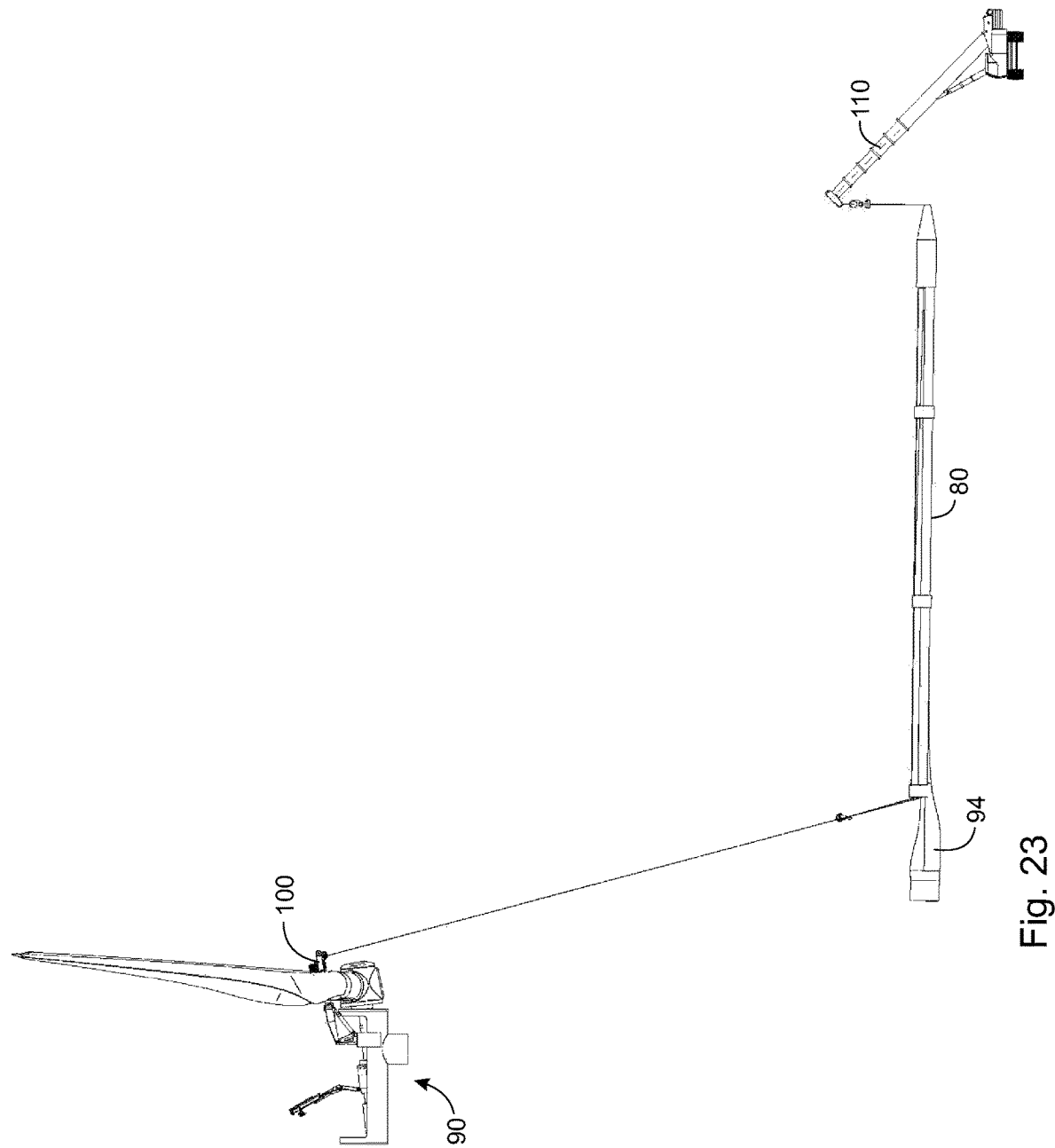
FIG. 23 depicts the rotor blade contained in the blade sheath lowered and horizontal to the ground.

As shown in FIG. 22, with the rotor blade 94 disconnected, the winch 36 of the lift system 100 may be operated to start lowering the blade sheath 80 with the rotor blade 94 retained therein. The sheath lines 83a, 83b support the blade sheath 80 at the top end 81. To stabilize the bottom end 82 of the blade sheath 80 during lowering of the top end 81, the bottom end 82 is connected to a ground-based tailing crane 110, or other supporting apparatus. The tailing crane 110 helps prevent undue motion of the bottom end 82 of the blade sheath 80 while the top ends 81 is being lowered or raised. Once the top end 81 of the blade sheath 80 is fully lowered as seen in FIG. 23, the blade sheath 80 with the rotor blade 94 sheathed therein achieves a horizontal configuration with respect to the ground. The sheathed rotor blade may be lowered on to the ground or on to a transport vehicle or other structure.

Re-erection of the rotor blade 94 may be accomplished by reversing the procedure described above using the winch 36 of the lift system 100 to pull the blade sheath 80 upward toward the rotor 92. The hook 38 of the lift system 100 is therefore raiseable and lowerable by the winch 36 to raise and lower the blade sheath 80 with the rotor blade 94 retained therein when the rotor blade 94 is disconnected from the hub 93 or to raise and lower the blade sheath 80 to retain the rotor blade 94 in or release the rotor blade 94 from the blade sheath 80 when the rotor blade 94 is connected to the hub 93. It is understood that when the lift systems 1 or 200 are used instead, re-erection of the rotor blade from the wind turbine may be accomplished in a similar manner.

Operation of the lift systems 1, 100 or 200 may be accomplished by operator controls that can be operated from atop the wind turbine 90 or from the ground. The operator controls can be operatively connected to the lift systems 1 or 100 through electrical cables or wirelessly.

The novel features will become apparent to those of skill in the art upon examination of the description. It should be understood, however, that the scope of the claims should not be limited by the embodiments but should be given the broadest interpretation consistent with the wording of the claims and the specification as a whole.

The invention claimed is:

1. A nacelle-mountable lift system for mounting and dismounting a rotor blade of a wind turbine, the lift system comprising:
   a jib crane, the jib crane comprising a base removably mountable on a nacelle of the wind turbine and a jib mounted on the base;
   the jib comprising a boom arm supported on the base by at least one support strut extending between the base and the boom arm;
   a winch mounted on the boom arm;
   at least two sheaves rotatably mounted on the boom arm;
   a holder connectable to the blade; and,
   at least two lift cables passing over the at least two sheaves connecting the holder to the winch,
the boom arm positionable to position the holder beyond a rotor hub of the wind turbine when the crane is mounted on the nacelle,
wherein:
   the jib has a proximal end removably and pivotally mounted on the base and a distal end extending beyond the rotor hub when the crane is mounted on the nacelle;
   the jib is pivotable about a horizontal pivot axis to permit raising and lowering of the distal end of the jib;
   the at least one support strut comprises two side-mounted hydraulic cylinders pivotally connected to the base and to opposed sides of the boom arm;
   the at least two sheaves comprise a pair of opposed spaced-apart sheaves rotatably mounted on the boom arm at the distal end of the jib; and,
   the at least two lift cables comprise two lift cables that connect the holder to the winch.

2. The lift system of claim 1, wherein the at least two sheaves comprise two sheaves and the at least two lift cables comprise two lift cables.

3. The lift system of claim 1, wherein: the base comprises a vertically oriented mast having a vertically lower proximal end and a vertically higher distal end, the proximal end of the base mountable on the nacelle; and, the hydraulic cylinders operable to pivot the jib about the horizontal pivot axis to raise and lower the distal end of the jib.

4. The lift system of claim 1, wherein at least a portion of the base is rotatable about a vertical pivot axis to orient the jib laterally around the nacelle.

5. The lift system of claim 1, wherein the holder comprises a hook.

6. The lift system of claim 1, wherein the winch comprises a double drum winch.

7. The lift system of claim 1, wherein the at least two lift cables comprise at least two lift cable grommets, the holder comprises at least two holder cables permanently installed thereon comprising at least two holder cable grommets complementary to the at least two lift cable grommets, and the lift system further comprises at least two connecting pins insertable through the complementary grommets to secure the holder to the at least two lift cables.

* * * * *